US011010320B2

(12) United States Patent
Nonaka et al.

(10) Patent No.: US 11,010,320 B2
(45) Date of Patent: May 18, 2021

(54) COOKING APPARATUS, COOKING METHOD, NON-TRANSITORY RECORDING MEDIUM ON WHICH COOKING CONTROL PROGRAM IS RECORDED, AND COOKING-INFORMATION PROVIDING METHOD

(71) Applicant: Panasonic Intellectual Property Corporation of America, Torrance, CA (US)

(72) Inventors: Masao Nonaka, Osaka (JP); Motoji Ohmori, Osaka (JP); Shingo Matsumoto, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/601,610

(22) Filed: Jan. 21, 2015

(65) Prior Publication Data

US 2015/0213009 A1 Jul. 30, 2015

(30) Foreign Application Priority Data

Jan. 24, 2014 (JP) .............................. JP2014-011403

(51) Int. Cl.
*G06F 13/38* (2006.01)

(52) U.S. Cl.
CPC .................................. *G06F 13/385* (2013.01)

(58) Field of Classification Search
CPC .. A47J 27/00; A47J 36/32; A47J 27/10; A47J 37/0611; A47J 27/62; A47J 36/00; A23L 1/01; G05B 15/02; H04W 4/008; G10L 25/51; G10L 25/03; G08B 21/02

USPC .... 99/325–338, 468; 700/94, 207, 274, 299, 700/300; 219/702, 710, 715, 720, 492, 219/506

See application file for complete search history.

(56) References Cited

U.S. PATENT DOCUMENTS

| | | | | |
|---|---|---|---|---|
| 4,323,773 A | * | 4/1982 | Carpenter | G05B 19/124 219/714 |
| 4,568,810 A | * | 2/1986 | Carmean | H05B 6/6452 219/702 |
| 4,586,428 A | * | 5/1986 | Adamson | A47J 37/0611 99/332 |

(Continued)

FOREIGN PATENT DOCUMENTS

| | | |
|---|---|---|
| EP | 0 965 795 | 12/1999 |
| JP | 11-182850 | 7/1999 |

(Continued)

*Primary Examiner* — Eric S Stapleton
(74) *Attorney, Agent, or Firm* — Wenderoth, Lind & Ponack, L.L.P.

(57) ABSTRACT

A cooking apparatus includes: a storage that stores first cooking information indicating a cooking method for a first foodstuff and second cooking information indicating a cooking method for a second foodstuff; a placement unit on which the first foodstuff and the second foodstuff are placed; and a cooking controller that controls cooking of the first foodstuff, based on the first cooking information, and that controls cooking of the second foodstuff, based on the second cooking information, when the first foodstuff and the second foodstuff are placed on the placement unit. The storage includes a memory, and the cooking controller includes a processor.

8 Claims, 13 Drawing Sheets

(56) References Cited

U.S. PATENT DOCUMENTS

| | | | | |
|---|---|---|---|---|
| 4,628,351 A * | 12/1986 | Heo | A47J 37/00 | 219/506 |
| 4,780,588 A * | 10/1988 | Edamura | H05B 6/6482 | 219/714 |
| 4,922,435 A * | 5/1990 | Cahlander | A47J 27/14 | 700/207 |
| 4,924,048 A * | 5/1990 | Bunce | B65D 51/185 | 219/734 |
| 5,220,143 A * | 6/1993 | Kemske | B65D 81/3446 | 219/730 |
| 5,360,965 A * | 11/1994 | Ishii | H05B 6/64 | 219/705 |
| 5,361,681 A * | 11/1994 | Hedstrom | H05B 6/6438 | 99/331 |
| 5,426,280 A * | 6/1995 | Smith | H05B 6/6441 | 219/506 |
| 5,573,691 A * | 11/1996 | Yoshida | A21B 7/005 | 219/492 |
| 5,802,957 A * | 9/1998 | Wanat | A47J 37/0842 | 219/492 |
| 5,883,801 A * | 3/1999 | Drucker | G05D 23/1917 | 219/702 |
| 5,897,807 A * | 4/1999 | Edgar | A21B 1/48 | 219/700 |
| 5,919,389 A * | 7/1999 | Uehashi | H05B 6/6464 | 219/492 |
| 5,938,966 A * | 8/1999 | Oh | H05B 6/6441 | 219/702 |
| 5,986,249 A * | 11/1999 | Yoshino | H05B 6/6411 | 219/746 |
| 5,994,677 A * | 11/1999 | .ANG.kerlind | A47J 36/027 | 219/502 |
| 5,994,683 A * | 11/1999 | Braunisch | F24C 7/087 | 219/704 |
| 6,011,243 A * | 1/2000 | Arnold | G07F 9/02 | 219/214 |
| 6,026,372 A * | 2/2000 | Savage | G06Q 10/06 | 705/15 |
| 6,040,565 A * | 3/2000 | .ANG.kerlind | G01K 11/12 | 219/705 |
| 6,119,587 A * | 9/2000 | Ewald | A47F 10/06 | 426/418 |
| 6,124,583 A * | 9/2000 | Bowers | H05B 6/6441 | 219/702 |
| 6,198,975 B1 * | 3/2001 | Drucker | H05B 6/6435 | 219/678 |
| 6,227,041 B1 * | 5/2001 | Collins | G01N 5/045 | 219/711 |
| 6,229,130 B1 * | 5/2001 | Furuta | H05B 6/6455 | 219/494 |
| 6,274,859 B1 * | 8/2001 | Yoshino | H05B 6/6411 | 219/746 |
| 6,298,331 B1 * | 10/2001 | Walker | G06Q 10/087 | 705/15 |
| 6,320,169 B1 * | 11/2001 | Clothier | G06K 7/0008 | 219/620 |
| 6,320,641 B1 * | 11/2001 | Bauer | G01N 21/8806 | 348/E5.029 |
| 6,359,270 B1 * | 3/2002 | Bridson | G06Q 10/107 | 219/679 |
| 6,376,812 B2 * | 4/2002 | Yamada | H05B 6/6455 | 219/492 |
| 6,480,753 B1 * | 11/2002 | Calder | G06Q 10/107 | 219/679 |
| 6,508,762 B2 * | 1/2003 | Karnieli | G06F 19/324 | 128/921 |
| 6,550,681 B1 * | 4/2003 | Ross | H05B 6/6438 | 219/506 |
| 6,557,756 B1 * | 5/2003 | Smith | G06Q 10/107 | 219/679 |
| 6,559,882 B1 * | 5/2003 | Kerchner | H05B 6/6435 | 219/506 |
| 6,590,192 B2 * | 7/2003 | Taino | H05B 6/6455 | 219/710 |
| 6,658,994 B1 * | 12/2003 | McMillan | A23L 3/3418 | 219/214 |
| 6,694,221 B2 * | 2/2004 | Chavez | G06Q 10/087 | 700/236 |
| 6,698,657 B2 * | 3/2004 | Murphy | G06K 7/14 | 219/506 |
| 6,774,345 B1 * | 8/2004 | Kenk | A21B 1/26 | 219/494 |
| 6,809,301 B1 * | 10/2004 | McIntyre | F24C 7/082 | 219/492 |
| 6,829,384 B2 * | 12/2004 | Schneiderman | G06K 9/3241 | 375/240.19 |
| 6,842,719 B1 * | 1/2005 | Fitzpatrick | G06Q 10/06 | 702/182 |
| 6,862,494 B2 * | 3/2005 | Hu | A47J 36/321 | 700/211 |
| 6,925,471 B2 * | 8/2005 | Bodin | G06Q 10/08 | 235/462.01 |
| 6,930,296 B2 * | 8/2005 | Chen | A21B 3/07 | 219/388 |
| 6,953,919 B2 * | 10/2005 | Clothier | H05B 6/062 | 219/494 |
| 6,957,777 B1 * | 10/2005 | Huang | B29C 45/14639 | 235/375 |
| 6,976,004 B2 * | 12/2005 | Wittrup | G06Q 50/12 | 705/15 |
| 6,982,640 B2 * | 1/2006 | Lindsay | G06K 19/0717 | 340/540 |
| 7,009,519 B2 * | 3/2006 | Leonard | B05B 11/0054 | 340/572.8 |
| 7,044,380 B2 * | 5/2006 | Knehr-Mclaren | G06Q 30/02 | 235/375 |
| 7,080,593 B1 * | 7/2006 | Frankel | A47J 36/32 | 99/326 |
| 7,092,988 B1 * | 8/2006 | Bogatin | F24C 15/325 | 219/702 |
| 7,188,139 B1 * | 3/2007 | Ayatsuka | G06F 1/1616 | 382/103 |
| 7,245,221 B2 * | 7/2007 | Claudatos | G06Q 10/087 | 340/10.1 |
| 7,275,690 B1 * | 10/2007 | White | G06Q 10/087 | 235/383 |
| 7,315,247 B2 * | 1/2008 | Jung | F25D 29/005 | 340/572.1 |
| 7,326,888 B2 * | 2/2008 | Chun | F24C 7/08 | 219/412 |
| 7,375,294 B2 * | 5/2008 | Kraft | G01G 19/4144 | 177/25.15 |
| 7,404,519 B2 * | 7/2008 | Jeon, III | H05B 6/6441 | 235/462.13 |
| 7,503,691 B2 * | 3/2009 | Kojima | B23Q 11/0007 | 374/141 |
| 7,535,002 B2 * | 5/2009 | Johnson | G01J 5/02 | 250/332 |
| 7,580,563 B1 * | 8/2009 | Bourdev | G06K 9/00234 | 382/165 |
| 7,580,771 B2 * | 8/2009 | Quail | B22D 17/007 | 700/197 |
| 7,723,655 B2 * | 5/2010 | Kim | H05B 6/6441 | 219/714 |
| 7,738,678 B2 * | 6/2010 | Breed | B60R 21/01552 | 382/100 |
| 7,742,951 B2 * | 6/2010 | Ebrom | G06Q 30/0641 | 705/26.4 |
| 7,755,006 B2 * | 7/2010 | Jones | F24C 7/08 | 219/412 |
| 7,820,948 B1 * | 10/2010 | Renau | A47J 31/52 | 219/494 |
| 7,983,817 B2 * | 7/2011 | Breed | B60N 2/0232 | 701/45 |
| 7,994,962 B1 * | 8/2011 | Ben-Shmuel | H01Q 19/18 | 342/13 |
| 8,191,465 B2 * | 6/2012 | Sager | H05B 6/6441 | 99/332 |

(56) References Cited

U.S. PATENT DOCUMENTS

| | | | | |
|---|---|---|---|---|
| 8,193,474 B2* | 6/2012 | Harris | F24C 7/08 | 219/494 |
| 8,207,479 B2* | 6/2012 | Ben-Shmuel | H05B 6/705 | 219/746 |
| 8,224,892 B2* | 7/2012 | Bogatin | F24C 15/325 | 709/203 |
| 8,276,506 B2* | 10/2012 | Tojo | A47J 36/165 | 99/334 |
| 8,323,026 B2* | 12/2012 | Do | G09B 21/003 | 434/127 |
| 8,335,550 B2* | 12/2012 | Segman | A61B 5/14546 | 600/310 |
| 8,342,847 B2* | 1/2013 | Do | G09B 21/00 | 434/127 |
| 8,372,459 B2* | 2/2013 | Owensby | A23L 5/10 | 426/231 |
| 8,389,916 B2* | 3/2013 | Ben-Shmuel | H05B 6/705 | 219/748 |
| 8,419,433 B2* | 4/2013 | Do | G06F 16/9535 | 434/127 |
| 8,419,434 B2* | 4/2013 | Do | G09B 21/003 | 434/127 |
| 8,492,686 B2* | 7/2013 | Bilchinsky | H05B 6/6447 | 219/678 |
| 8,570,177 B2* | 10/2013 | Drucker | H05B 6/6441 | 340/584 |
| 8,571,942 B2* | 10/2013 | Ebrom | G06Q 30/0601 | 705/26.1 |
| 8,610,038 B2* | 12/2013 | Hyde | H05B 6/72 | 219/702 |
| 8,653,482 B2* | 2/2014 | Ben-Shmuel | A23L 3/363 | 250/492.1 |
| 8,676,656 B2* | 3/2014 | Ebrom | G06Q 30/0258 | 705/26.1 |
| 8,759,729 B2* | 6/2014 | Ben-Shmuel | H05B 6/647 | 219/724 |
| 8,795,138 B1* | 8/2014 | Yeh | G06F 3/165 | 482/8 |
| 8,820,624 B2* | 9/2014 | Park | G06Q 10/00 | 235/375 |
| 8,839,527 B2* | 9/2014 | Ben-Shmuel | H05B 6/6458 | 34/260 |
| 8,927,913 B2* | 1/2015 | Hyde | H05B 6/705 | 219/702 |
| 8,941,040 B2* | 1/2015 | Ben-Shmuel | H05B 6/705 | 219/702 |
| 8,992,225 B2* | 3/2015 | Do | G06F 3/016 | 434/127 |
| 9,040,883 B2* | 5/2015 | Ben-Shmuel | H05B 6/647 | 219/702 |
| 9,078,298 B2* | 7/2015 | Ben-Shmuel | H05B 6/647 | 219/702 |
| 9,107,434 B2* | 8/2015 | Singh | F24C 7/087 | |
| 9,129,229 B2* | 9/2015 | Ben-Haim | G06Q 20/3278 | |
| 9,131,543 B2* | 9/2015 | Ben-Shmuel | A23L 5/15 | |
| 9,161,395 B2* | 10/2015 | Lambert | H05B 6/6447 | |
| 9,167,633 B2* | 10/2015 | Ben-Shmuel | H05B 6/6402 | |
| 9,215,756 B2* | 12/2015 | Bilchinsky | H05B 6/00 | |
| 9,332,877 B2* | 5/2016 | Cochran | B65D 81/34 | |
| 9,357,877 B2* | 6/2016 | Cochran | A47J 36/02 | |
| 9,374,852 B2* | 6/2016 | Bilchinsky | H05B 6/687 | |
| 9,414,442 B2* | 8/2016 | Torres | H05B 6/6438 | |
| 9,459,346 B2* | 10/2016 | Einziger | F26B 3/347 | |
| 9,538,880 B2* | 1/2017 | Riefenstein | H05B 6/6435 | |
| 9,699,835 B2* | 7/2017 | Yogev | H05B 6/6447 | |
| 2001/0002674 A1* | 6/2001 | Gubbini | A21C 9/08 | 221/13 |
| 2002/0026325 A1* | 2/2002 | Hirahara | G06Q 30/0601 | 705/1.1 |
| 2002/0082924 A1* | 6/2002 | Koether | G06Q 10/06 | 705/15 |
| 2002/0143638 A1* | 10/2002 | August | G06Q 20/20 | 705/14.27 |
| 2002/0148858 A1* | 10/2002 | Bertone | A47J 31/41 | 222/129.4 |
| 2002/0158065 A1* | 10/2002 | Taino | H05B 6/68 | 219/710 |
| 2002/0171674 A1* | 11/2002 | Paris | G06Q 99/00 | 715/700 |
| 2002/0194074 A1* | 12/2002 | Jacobs | G07G 1/145 | 705/16 |
| 2003/0037681 A1* | 2/2003 | Zhu | A23L 5/13 | 99/325 |
| 2003/0133840 A1* | 7/2003 | Coombs | G01N 33/54386 | 422/82.05 |
| 2003/0183972 A1* | 10/2003 | Weber | B29C 48/865 | 264/85 |
| 2004/0056761 A1* | 3/2004 | Vaseloff | A47J 39/006 | 340/309.16 |
| 2004/0099144 A1* | 5/2004 | Kudo | G06Q 30/06 | 99/325 |
| 2004/0099735 A1* | 5/2004 | Neumark | G06Q 10/087 | 235/385 |
| 2004/0106211 A1* | 6/2004 | Kauer | G01N 21/85 | 436/169 |
| 2004/0208961 A1* | 10/2004 | Reckert | A47J 43/18 | 426/275 |
| 2004/0260513 A1* | 12/2004 | Fitzpatrick | G06Q 30/02 | 702/182 |
| 2004/0262391 A1* | 12/2004 | Harris | G07G 1/0054 | 235/454 |
| 2005/0016996 A1* | 1/2005 | Chun | H05B 6/6435 | 219/685 |
| 2005/0046584 A1* | 3/2005 | Breed | B60N 2/0232 | 340/13.31 |
| 2005/0080679 A1* | 4/2005 | Barton | G07F 9/002 | 705/16 |
| 2005/0167489 A1* | 8/2005 | Barton | G07G 1/0018 | 235/381 |
| 2005/0173527 A1* | 8/2005 | Conzola | G07G 1/0054 | 235/385 |
| 2005/0193901 A1* | 9/2005 | Buehler | A47J 44/00 | 99/468 |
| 2005/0211775 A1* | 9/2005 | Vaseloff | G06Q 10/087 | 235/385 |
| 2005/0256774 A1* | 11/2005 | Clothier | G06Q 10/06 | 705/15 |
| 2005/0258961 A1* | 11/2005 | Kimball | G06Q 20/203 | 340/572.1 |
| 2006/0010037 A1* | 1/2006 | Angert | G06Q 30/0601 | 705/15 |
| 2006/0020486 A1* | 1/2006 | Kurzweil | G06Q 99/00 | 382/111 |
| 2006/0033620 A1* | 2/2006 | Mathewson, II | G07G 1/009 | 340/572.1 |
| 2006/0038008 A1* | 2/2006 | Miller | G01G 23/3728 | 235/383 |
| 2006/0043179 A1* | 3/2006 | Nycz | G16H 40/63 | 235/385 |
| 2006/0111811 A1* | 5/2006 | Okamoto | B25J 9/0003 | 700/214 |
| 2006/0114116 A1* | 6/2006 | Mullet | H04L 12/2827 | 340/679 |
| 2006/0179022 A1* | 8/2006 | Holland | G06N 3/004 | 706/45 |
| 2006/0218057 A1* | 9/2006 | Fitzpatrick | G06Q 10/087 | 705/28 |
| 2006/0232383 A1* | 10/2006 | Yoon | G06K 7/10019 | 340/10.2 |
| 2006/0259372 A1* | 11/2006 | Perrier | G06Q 30/00 | 705/26.1 |
| 2006/0278093 A1* | 12/2006 | Biderman | A47J 31/52 | 99/282 |
| 2006/0278710 A1* | 12/2006 | Park | H05B 6/6441 | 235/462.15 |
| 2006/0282331 A1* | 12/2006 | Jacobs | G07G 1/0054 | 705/22 |
| 2007/0001012 A1* | 1/2007 | Kim | H05B 6/6441 | 235/462.13 |

(56) References Cited

U.S. PATENT DOCUMENTS

| | | | |
|---|---|---|---|
| 2007/0007279 A1* | 1/2007 | Chun | H05B 6/6441 219/506 |
| 2007/0039940 A1* | 2/2007 | Kim | H05B 6/763 219/217 |
| 2007/0088624 A1* | 4/2007 | Vaughn | G06Q 50/12 705/15 |
| 2007/0104845 A1* | 5/2007 | Toppano | A47J 36/00 426/523 |
| 2007/0114224 A1* | 5/2007 | Nagamitsu | G06K 9/00355 219/490 |
| 2007/0137633 A1* | 6/2007 | McFadden | H05B 6/60 126/21 A |
| 2007/0158417 A1* | 7/2007 | Brewington | G06Q 30/06 235/383 |
| 2007/0215608 A1* | 9/2007 | Yoshino | H05B 6/74 219/681 |
| 2007/0215612 A1* | 9/2007 | Hicks | H05B 6/74 219/746 |
| 2007/0246453 A1* | 10/2007 | Nam | F24C 7/082 219/413 |
| 2007/0251521 A1* | 11/2007 | Schackmuth | G06Q 10/087 126/369 |
| 2007/0254080 A1* | 11/2007 | Schackmuth | G06Q 50/12 426/523 |
| 2008/0047959 A1* | 2/2008 | Moriya | H05B 6/685 219/745 |
| 2008/0078229 A1* | 4/2008 | Mancevski | G01Q 40/02 73/1.79 |
| 2008/0088853 A1* | 4/2008 | Hwang | G01B 11/02 356/498 |
| 2008/0105675 A1* | 5/2008 | Choi | H05B 6/745 219/749 |
| 2008/0160967 A1* | 7/2008 | Narasimhan | H04M 1/72583 455/414.1 |
| 2008/0181821 A1* | 7/2008 | Jung | B01L 3/502753 422/82.02 |
| 2008/0193614 A1* | 8/2008 | Greiner | F24C 7/08 426/231 |
| 2008/0206420 A1* | 8/2008 | McFadden | A23L 5/17 426/523 |
| 2008/0256008 A1* | 10/2008 | Kwok | G06N 3/004 706/20 |
| 2008/0264269 A1* | 10/2008 | Sterzel | F24C 7/08 99/331 |
| 2008/0280000 A1* | 11/2008 | Breunig | A23L 5/15 426/523 |
| 2008/0296284 A1* | 12/2008 | McFadden | A23L 5/17 219/400 |
| 2009/0006196 A1* | 1/2009 | Barkan | G06K 7/10881 705/14.34 |
| 2009/0071110 A1* | 3/2009 | Gonze | F01N 3/028 55/282.3 |
| 2009/0236334 A1* | 9/2009 | Ben-Shmuel | H05B 6/808 219/703 |
| 2009/0265216 A1* | 10/2009 | Flynn | G06Q 30/0222 705/7.31 |
| 2009/0274802 A1* | 11/2009 | Kling | F24C 7/08 426/231 |
| 2009/0293733 A1* | 12/2009 | Martin | G07F 13/065 99/280 |
| 2010/0015313 A1* | 1/2010 | Harris | F24C 7/08 426/523 |
| 2010/0045705 A1* | 2/2010 | Vertegaal | G06F 3/0482 345/661 |
| 2010/0123001 A1* | 5/2010 | Park | G06Q 99/00 235/375 |
| 2010/0145899 A1* | 6/2010 | Buehler | G08B 13/19671 706/47 |
| 2010/0155392 A1* | 6/2010 | Nordh | H05B 6/68 219/702 |
| 2010/0176121 A1* | 7/2010 | Nobue | H05B 6/705 219/716 |
| 2010/0182136 A1* | 7/2010 | Pryor | F24C 7/082 340/425.5 |
| 2010/0187224 A1* | 7/2010 | Hyde | H05B 6/6455 219/720 |
| 2010/0237067 A1* | 9/2010 | Nordh | H05B 6/74 219/690 |
| 2010/0252551 A1* | 10/2010 | Nordh | H05B 6/74 219/702 |
| 2010/0321152 A1* | 12/2010 | Argudyaev | G06K 9/00046 340/5.53 |
| 2010/0332571 A1* | 12/2010 | Healey | G06F 19/3475 707/759 |
| 2011/0002677 A1* | 1/2011 | Cochran | A47J 37/0623 392/416 |
| 2011/0022211 A1* | 1/2011 | McIntyre | H05B 6/688 700/108 |
| 2011/0023689 A1* | 2/2011 | Ivanich | A63F 13/65 84/609 |
| 2012/0000976 A1* | 1/2012 | Rollyson | G06Q 20/208 235/375 |
| 2012/0095616 A1* | 4/2012 | Karlsson | A47J 31/545 700/306 |
| 2012/0105424 A1* | 5/2012 | Lee | G09F 27/00 345/212 |
| 2012/0260683 A1* | 10/2012 | Cheon | F25D 29/00 62/125 |
| 2013/0052616 A1* | 2/2013 | Silverstein | G09B 19/0092 434/127 |
| 2013/0085345 A1* | 4/2013 | Geisner | G02B 27/017 600/300 |
| 2013/0098988 A1* | 4/2013 | Ben-Haim | G06Q 20/24 235/375 |
| 2013/0186887 A1* | 7/2013 | Hallgren | H05B 6/686 219/702 |
| 2013/0302483 A1* | 11/2013 | Riefenstein | G06T 7/001 426/233 |
| 2014/0009287 A1* | 1/2014 | Fukushi | G06Q 50/22 340/540 |
| 2014/0026762 A1* | 1/2014 | Riefenstein | H05B 6/6441 99/325 |
| 2014/0207517 A1* | 7/2014 | Oshima | H04L 67/146 705/7.29 |
| 2014/0232903 A1* | 8/2014 | Oshima | H04B 10/541 348/229.1 |

FOREIGN PATENT DOCUMENTS

| | | |
|---|---|---|
| JP | 2000-97436 | 4/2000 |
| JP | 2002-156117 | 5/2002 |
| JP | 2002-168453 | 6/2002 |
| JP | 2002-257351 | 9/2002 |
| JP | 2006-153432 | 6/2006 |
| JP | 2006-275489 | 10/2006 |

* cited by examiner

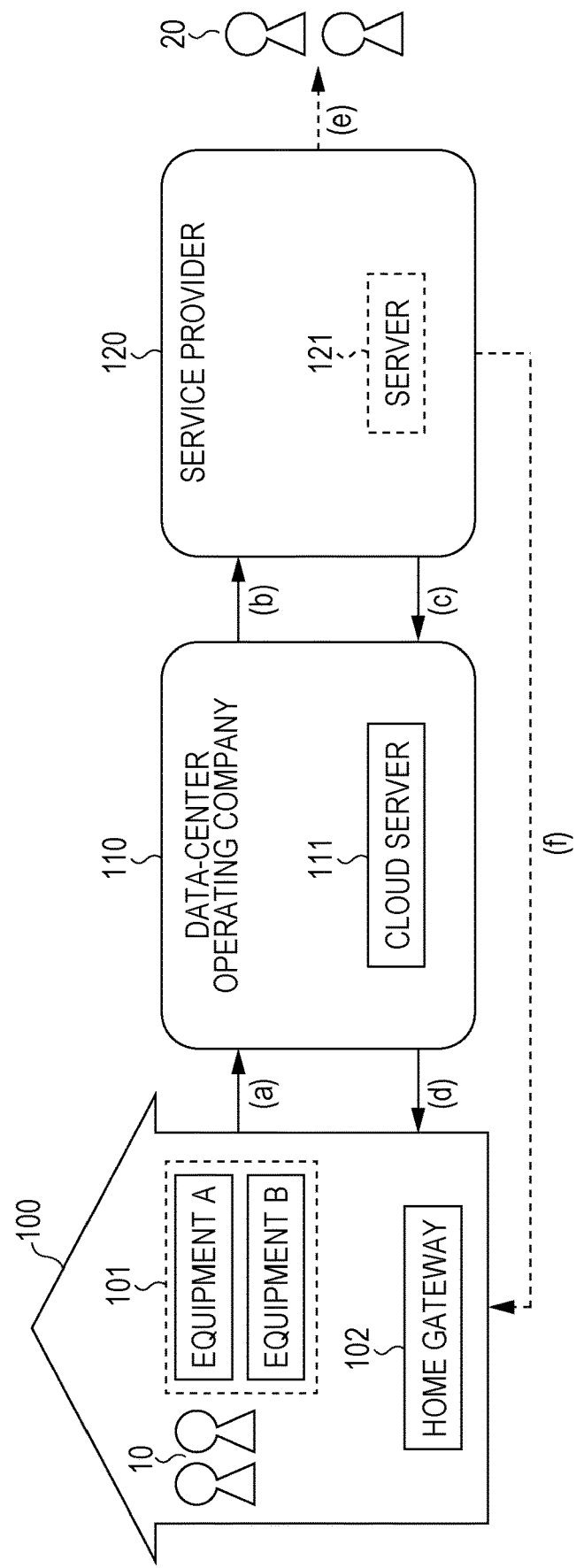

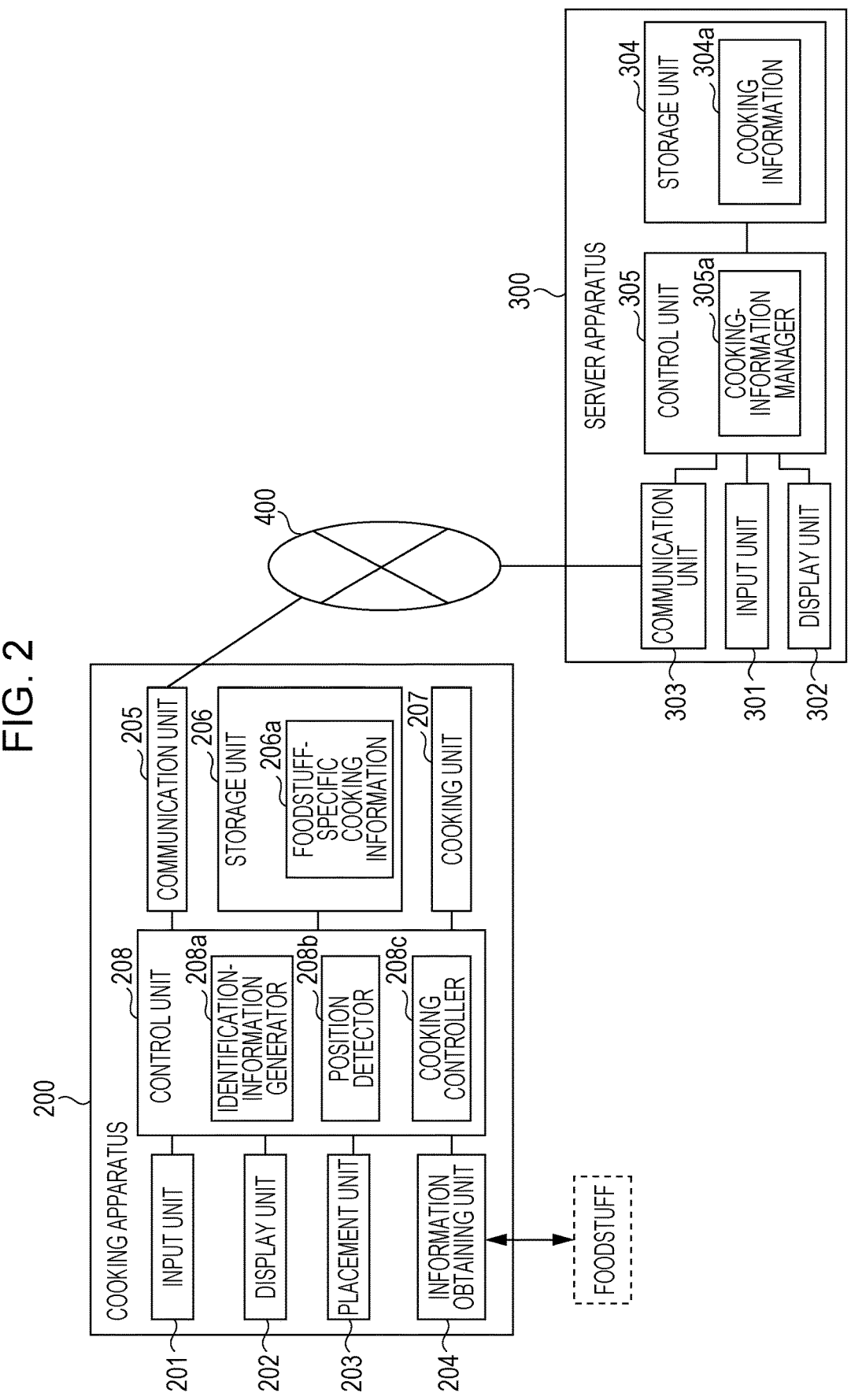

FIG. 3

| FOODSTUFF ID | FOODSTUFF NAME | HEATING METHOD | WATTAGE | HEATING TIME |
|---|---|---|---|---|
| 6 | RICE | STEAM HEATING | 500 W | 1 min |
| 7 | HAMBURGER STEAK | HEATER HEATING | 600 W | 2 min |

| FOODSTUFF ID | FOODSTUFF NAME | WEIGHT | HEATING METHOD | WATTAGE | HEATING TIME | RELATED-FOODSTUFF ID | RANKING |
|---|---|---|---|---|---|---|---|
| 1 | SALMON SLICE | LESS THAN 100 g | MICROWAVE HEATING | 500 W | 3 min | 3 | 1 |
| 2 | SALMON SLICE | 100 g OR MORE | MICROWAVE HEATING | 600 W | 3.5 min | 3 | 1 |
| 3 | SALMON SKIN | — | HEATER HEATING | 800 W | 4 min | 1,2 | 2 |
| 3 | SALMON SKIN | — | HEATER HEATING | 800 W | 5 min | 1,2 | 1 |
| 3 | SALMON SKIN | — | HEATER HEATING | 800 W | 6 min | 1,2 | 3 |
| 4 | SALMON | — | MICROWAVE HEATING | 600 W | 4 min | — | 1 |
| 5 | TAKOYAKI | — | HEATER HEATING | 600 W | 8 min | — | 1 |
| 6 | RICE | — | STEAM HEATING | 500 W | 1 min | 7 | 1 |
| 7 | HAMBURGER STEAK | — | HEATER HEATING | 600 W | 2 min | 6 | 1 |
| ⋮ | ⋮ | ⋮ | ⋮ | ⋮ | ⋮ | ⋮ | ⋮ |

304a

COOKING APPARATUS, COOKING METHOD, NON-TRANSITORY RECORDING MEDIUM ON WHICH COOKING CONTROL PROGRAM IS RECORDED, AND COOKING-INFORMATION PROVIDING METHOD

CROSS REFERENCES TO RELATED APPLICATIONS

This Application claims priority to Japanese Patent Application No. 2014-011403, filed on Jan. 24, 2014, the contents of which are hereby incorporated by reference.

BACKGROUND

1. Technical Field

The present disclosure relates to a cooking apparatus, a cooking method, a non-transitory recording medium on which a cooking control program is recorded, and a cooking-information providing method, the apparatus, the methods, and the program realizing appropriate cooking of a plurality of foodstuffs.

2. Description of the Related Art

Year after year, cooking appliances are becoming increasingly multi-functionalized. For example, microwave cooking equipment (e.g., multifunction microwave ovens) having heating functions, such as a steam heating function, a grill heating function, and/or an oven heating function, other than a microwave heating function, are becoming available. Microwave cooking equipment that allows information of recipes and so on to be viewed on a liquid-crystal display is also making an appearance.

For example, Japanese Unexamined Patent Application Publication No. 11-182850 discloses a microwave oven that stores heating control information in association with Japanese Article Number (JAN) codes.

When a JAN code is specified, the microwave oven performs heating and cooking based on heating information corresponding to the specified JAN code.

Japanese Unexamined Patent Application Publication No. 2002-257351 also disclosures a microwave oven that uses an infrared sensor to measure, when food is placed at a plurality of places in a heating chamber, temperatures at the places where the individual food is placed and that intensively heats a place that has not reached a predetermined temperature.

SUMMARY

In one general aspect, the techniques disclosed here feature a cooking apparatus including: a storage that stores first cooking information indicating a cooking method for a first foodstuff and second cooking information indicating a cooking method for a second foodstuff; a placement unit on which the first foodstuff and the second foodstuff are placed; and a cooking controller that controls cooking of the first foodstuff, based on the first cooking information, and that controls cooking of the second foodstuff, based on the second cooking information, when the first foodstuff and the second foodstuff are placed on the placement unit. The storage may include a memory. The cooking controller may include a processor.

These general and specific aspects may be implemented using a system, a method, and a computer program, and any combination of systems, methods, and computer programs. According to the cooking apparatus disclosed herein, optimum cooking can be performed with a little time and effort during cooking of a plurality of foodstuffs placed at different positions.

Additional benefits and advantages of the disclosed embodiments will be apparent from the specification and Figures.

The benefits and/or advantages may be individually provided by the various embodiments and features of the specification and drawings disclosure, and need not all be provided in order to obtain one or more of the same.

BRIEF DESCRIPTION OF THE DRAWINGS

FIG. 1A is a diagram illustrating an overview of a cooking-information providing service according to an embodiment of the present disclosure;

FIG. 2 is a diagram illustrating one example of the configuration of a cooking system according to the embodiment of the present disclosure;

FIG. 3 is a table illustrating one example of foodstuff-specific cooking information in the embodiment of the present disclosure;

FIG. 6 is a table illustrating one example of cooking information in the embodiment of the present disclosure;

DETAILED DESCRIPTION

Figure 1B:
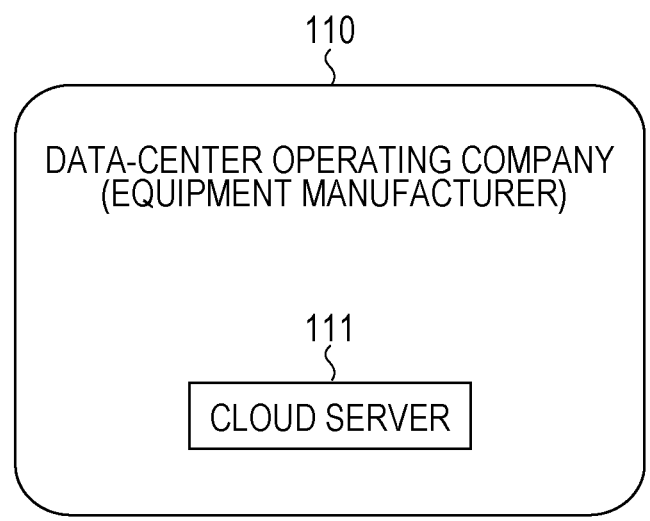
FIG. 1B is a diagram illustrating an example of a case, in which a data-center operating company 110 is an equipment manufacturer, in a cooking-information providing service according to the embodiment of the present disclosure.

First, items that the present inventors have studied in order to invent the aspects according to the present disclosure.

(Knowledge Underlying Present Disclosure)

The related art disclosed in Japanese Unexamined Patent Application Publication No. 11-182850 does not consider heating two types of foodstuff in a heating chamber in a microwave oven, and thus optimum cooking cannot be performed on two types of foodstuff.

Although the related art illustrated in Japanese Unexamined Patent Application Publication No. 2002-257351 is intended to equalize the temperatures of places where foodstuffs are placed, equalizing the temperatures of the places does not necessarily lead to optimum cooking for each of the two types of foodstuff.

In view of the foregoing, it is desired to develop a cooking apparatus that can perform optimum cooking with a little time and effort during cooking of a plurality of foodstuffs.

The present disclosure provides a cooking apparatus, a cooking method a non-transitory recording medium on which a cooking control program is recorded, and a cooking-information providing method, the apparatus, the methods, and the program making it possible to perform optimum cooking with a little time and effort during cooking of a plurality of foodstuffs.

A cooking apparatus according to the present disclosure includes: a storage that stores first cooking information indicating a cooking method for a first foodstuff and second cooking information indicating a cooking method for a second foodstuff; a placement unit on which the first foodstuff and the second foodstuff are placed at different positions; and a cooking controller that controls cooking of the first foodstuff, based on the first cooking information, and that controls cooking of the second foodstuff, based on the second cooking information, when the first foodstuff and the second foodstuff are placed at different positions on the placement unit. The storage may include a memory. The cooking controller may include a processor.

With such a configuration, optimum cooking can be performed with a little time and effort during cooking of a plurality of foodstuffs placed at different positions.

The cooking apparatus according to the present disclosure further includes: a communicator that receives the first cooking information and the second cooking information transmitted by a server apparatus connected to a network. The storage stores the first cooking information and the second cooking information received by the communicator.

With such a configuration, the first foodstuff and the second foodstuff placed at different positions can be respectively cooked based on the first cooking information and the second cooking information transmitted from the server apparatus.

In the cooking apparatus according to the present disclosure, the communicator transmits identification information for identifying the first foodstuff and the second foodstuff or identifying food including the first foodstuff and the second foodstuff to the server apparatus and receives the first cooking information and the second cooking information that the server apparatus transmits in accordance with the identification information, and the storage stores the first cooking information and the second cooking information received by the communicator.

With such a configuration, the first cooking information and the second cooking information can be received from the server apparatus, based on the identification information.

The cooking apparatus according to the present disclosure further includes an identification-information generator that generates the identification information, based on an audio signal input by a microphone.

With such a configuration, each foodstuff can be identified based on the audio signal input by the microphone input.

The cooking apparatus according to the present disclosure further includes an information generator that generates the identification information, based on an image captured by a camera.

With such a configuration, each foodstuff can be identified based on the image captured by the camera.

The cooking apparatus according to the present disclosure further includes an information generator that generates the identification information, based on the first foodstuff and the second foodstuff or a barcode attached to a food package that wraps the first foodstuff and the second foodstuff.

With such a configuration, each foodstuff can be identified based on the barcode attached to the package of the food.

In the cooking apparatus according to the present disclosure, when identification information for identifying the first foodstuff and the second foodstuff or identifying food including the first foodstuff and the second foodstuff is transmitted from a terminal apparatus to the server apparatus, the communicator receives the first cooking information and the second cooking information that the server apparatus transmits in accordance with the identification information, and the storage stores the first cooking information and the second cooking information received by the communicator.

With such a configuration, the first cooking information and the second cooking information can be received from the server apparatus, based on the identification information.

In the cooking apparatus according to the present disclosure, the identification information further includes information of a weight of the first foodstuff and the second foodstuff or a weight of food including the first foodstuff and the second foodstuff, and the communicator receives the first cooking information and the second cooking information that the server apparatus transmits. And each of the first cooking information and the second cooking information is determined based on the weight information.

With such a configuration, the first cooking information and the second cooking information can be received from the server apparatus, based on the weight information.

The cooking apparatus according to the present disclosure further includes a position detector that detects positions of the first foodstuff and the second foodstuff placed on the placement unit. The cooking controller individually controls the cooking of the first foodstuff and the cooking of the second foodstuff, based on the positions of the first foodstuff and the second foodstuff, the positions being detected by the position detector.

With such a configuration, the first foodstuff and the second foodstuff placed at different positions can be cooked individually.

In the cooking apparatus according to the present disclosure, the first foodstuff and the second foodstuff are different portions of one type of food.

With such a configuration, two different types of food can be cooked with different cooking methods.

In the cooking apparatus according to the present disclosure, the first foodstuff and the second foodstuff are different portions of one type of food.

With such a configuration, different portions of one type of food can be cooked with different cooking methods.

In the cooking apparatus according to the present disclosure, the first cooking information and the second cooking information are information selected based on ordering performed by a plurality of users.

With such a configuration, the first foodstuff and the second foodstuff can be cooked based on the ordering performed by the plurality of users.

A cooking method according to the present disclosure is directed to a cooking method using a cooking apparatus. The cooking method causes a computer for the cooking apparatus to execute: reading first cooking information and second cooking information from a storage of the cooking apparatus when a first foodstuff and a second foodstuff are placed at different positions on a placement unit in the cooking apparatus, the first cooking information indicating a cooking method for the first foodstuff and the second cooking information indicating a cooking method for the second foodstuff; and controlling cooking of the first foodstuff, based on the first cooking information, and controlling cooking of the second foodstuff, based on the second cooking information. And at least one of the reading and the controlling may be performed by a processor.

With such a configuration, optimum cooking can be performed with a little time and effort during cooking of a plurality of foodstuffs placed at different positions.

A recording medium according to the present disclosure is directed to a computer-readable non-transitory tangible recording medium on which a cooking control program for a computer is recorded. The cooking control program causes the computer to execute: reading first cooking information and second cooking information from a storage unit when a first foodstuff and a second foodstuff are placed on a placement unit included in the computer, the first cooking information indicating a cooking method for the first foodstuff and the second cooking information indicating a cooking method for the second foodstuff; and controlling cooking of the first foodstuff, based on the first cooking information, and controlling cooking of the second foodstuff, based on the second cooking information.

With such a configuration, optimum cooking can be performed with a little time and effort during cooking of a plurality of foodstuffs placed at different positions.

A cooking-information providing method is directed to a cooking-information providing method for a cooking-information management system in which a computer is connected to a cooking apparatus through a network to manage cooking information indicating cooking methods for foodstuffs, the cooking-information providing method causing the computer to execute: searching for, upon receiving identification information for identifying a first foodstuff and a second foodstuff or for identifying food including the first foodstuff and the second foodstuff from the cooking apparatus, first cooking information for the first foodstuff and second cooking information for the second foodstuff in a storage in which cooking information indicating cooking methods for foodstuffs is stored, based on the identification information; and transmitting the first cooking information and the second cooking information to the cooking apparatus that cooks the first foodstuff, based on the first cooking information, and that cooks the second foodstuff, based on the second cooking information, when the second foodstuff and the first foodstuff are placed at different positions on the placement unit. And at least one of the searching and the transmitting may be performed by a processor.

With such a configuration, optimum cooking can be performed with a little time and effort during cooking of a plurality of foodstuffs placed at different positions.

An embodiment of the present disclosure will be described below with reference to the accompanying drawings.

The embodiment described below represents a specific example of the present disclosure. Numerical values, shapes, constituent elements, steps, the order of steps, and so on described in the embodiment below are merely examples and are not intended to limit the present disclosure. Of the constituent elements in the embodiments described below, the constituent elements not set forth in the independent claims that represent the broadest concept will be described as optional constituent elements. In the embodiment, the contents thereof may also be combined.

Figure 1C:
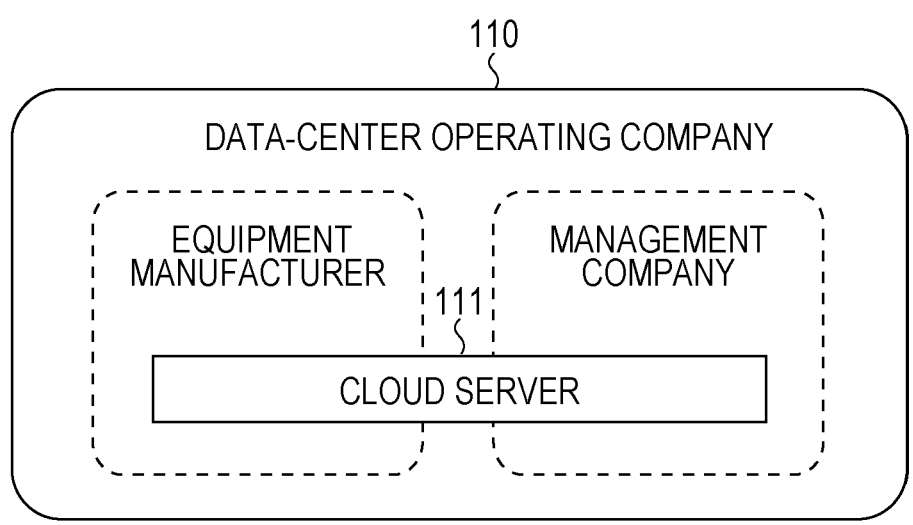
FIG. 1C is a diagram illustrating an example of a case in which the data-center operating company 110 serves as both an equipment manufacturer and another management company in a cooking-information providing service according to the embodiment of the present disclosure.

First, a description will be given of an overview of a cooking-information providing service according to the embodiment of the present disclosure. FIGS. 1A, 1B, and 1C are diagrams illustrating an overview of a cooking-information providing service according to the embodiment of the present disclosure. FIG. 1A illustrates one example of an overview of an information providing system according to the embodiment of the present disclosure. A group 100 is, for example, a company, an entity, or a household, and the scale thereof is not limited.

At the group 100, a plurality of pieces of equipment 101, including equipment A and equipment B, and a home gateway 102 are provided. The pieces of equipment 101 include equipment that can connect to the Internet (e.g., a smartphone, a personal computer (PC), and a television (TV)) and equipment that is incapable of connecting to the Internet on their own (e.g., microwave cooking equipment, lighting equipment, a washing machine, and a refrigerator). The pieces of equipment 101 may also include equipment that is incapable of connecting to the Internet on their own but that can connect to the Internet via the home gateway 102. Also, the group 100 includes users 10 of the pieces of equipment 101.

A data-center operating company 110 has a cloud server 111. The cloud server 111 is a virtualization server that cooperates with various types of equipment through the Internet. The cloud server 111 mainly manages, for example, big data that is difficult to process with a typical database management tool or the like.

The data-center operating company 110 performs data management, management of the cloud server 111, operations of a data center that performs the management, and so on. Details of a service provided by the data-center operating company 110 are described later.

In this case, the data-center operating company 110 is not limited to a company that performs only data management, operations of the cloud server 111, or the like. FIG. 1B illustrates one example of a case in which a data-center operating company 110 is an equipment manufacturer.

For example, when an equipment manufacturer that develops and manufactures one type of equipment of the pieces of equipment 101 also performs data management, management of the cloud server 111, and so on, this equipment manufacturer corresponds to the data-center operating company 110, as illustrated in FIG. 1B.

The data-center operating company 110 is not limited to a single company. FIG. 1C illustrates one example of a case in which the data-center operating company 110 serves as both an equipment manufacturer and another management company. For example, when the equipment manufacturer and another management company perform data management and operation of the cloud server 111 in cooperation with each other or in a shared manner, one of or both the equipment manufacturer and the other management company correspond(s) to the data-center operating company 110, as illustrated in FIG. 1C.

Referring back to FIG. 1A, a service provider 120 has a server 121. The size of the server 121 as used herein is not limited, and examples of the server 121 include a memory in a PC and so on. The service provider 120 may or may not have the server 121.

In the service described above, the home gateway 102 is not essential. For example, when the cloud server 111 performs all data management, the home gateway 102 is not necessary. There are also cases in which the pieces of equipment 101 do not include any equipment that is incapable of connecting to the Internet on their own, as in a case in which all kinds of equipment in a home are connected to the Internet.

Next, a description will be given of a flow of information in the aforementioned service. First, the equipment A or B in the group 100 transmits log information to the cloud server 111 in the data-center operating company 110. The cloud server 111 accumulates the log information of the equipment A or B (as indicated by (a) in FIG. 1A).

In this case, the term "log information" refers to, for example, information indicating operation states, operation dates and times, and so on of the pieces of equipment 101. Examples of the log information include cooking information of microwave cooking equipment, the viewing history of a television, video-recording-reservation information of a recorder, the operation date and time of a washing machine, the amount of laundry thereof, the opening/closing date and time of a refrigerator door, and the number of times it was opened/closed. The log information, however, is not limited to those pieces of information and refers to any information that can be obtained from any kind of equipment.

The log information may also be directly supplied from the pieces of equipment 101 to the cloud server 111 through the Internet. The log information from the pieces of equipment 101 may also be temporarily aggregated in the home gateway 102 and be supplied from the home gateway 102 to the cloud server 111 in the data-center operating company 110.

Next, the cloud server 111 in the data-center operating company 110 supplies the aggregated log information to the service provider 120 in a certain unit of information. The unit of information may be a unit with which the data-center operating company 110 can organize the aggregated information and can supply it to the service provider 120 or may be a unit requested by the service provider 120. Although the unit of information has been described above as being a certain unit of information, it does not necessarily have to be a certain unit of information, and there are cases in which the amount of information to be supplied is changed depending on the situation.

The log information is stored in the server 121 of the service provider 120 (as indicated by (b) in FIG. 1A), as appropriate. The service provider 120 then organizes the log information into information that suits a service to be supplied to the users and supplies the organized log information to the users.

The users to which the log information is supplied may be the users 10 of the pieces of equipment 101 or may be users 20 outside the group 100. The information may be, for example, directly supplied from the service provider 120 to the users (as indicated by (e) and (f) in FIG. 1A). For example, the service may also be supplied to the users after going through the cloud server 111 in the data-center operating company 110 again (as indicated by (c) and (d) in FIG. 1A).

In addition, the cloud server 111 in the data-center operating company 110 may organize the log information into information that suits a service to be supplied to the users and supply the organized information to the service provider 120.

The users 10 and the users 20 may be different from each other or may be the same.

Next, a description will be given of one example of a cooking system according to an embodiment of the present disclosure. FIG. 2 is a diagram illustrating one example of the configuration of a cooking system according to the embodiment of the present disclosure. In this cooking system, a cooking apparatus 200 and a server apparatus 300 are connected to each other through a network 400. The network 400 may be a wired network or a wireless network. The network 400 may also include both a wired network and a wireless network.

Although FIG. 2 illustrates one cooking apparatus 200 and one server apparatus 300, two or more cooking apparatuses 200 and two or more server apparatuses 300 may be provided. The cooking apparatus 200 is used to cook foodstuffs and is, for example, microwave cooking equipment. The description below will be given assuming that the cooking apparatus 200 is microwave cooking equipment that heats and cooks foodstuffs.

The cooking apparatus 200 includes an input unit 201, a display unit 202, a placement unit 203, an information obtaining unit 204, a communication unit 205, a storage unit 206, a cooking unit 207, and a control unit 208.

The input unit 201 is an input device, such as buttons or a touch panel. The display unit 202 is a display device, such as a display. The placement unit 203 is a table on which a foodstuff to be cooked is placed for cooking. The placement unit 203 includes a weight scale that measures the weight of a foodstuff when it is placed thereon.

The information obtaining unit 204 is a device for obtaining information (identification information) necessary to identify each foodstuff to be cooked. For example, the information obtaining unit 204 is a camera for capturing an image of foodstuffs. In this case, image recognition is performed on the image captured by the camera to identify the foodstuffs. The information obtaining unit 204 may be a barcode reader that reads a barcode attached to a package that wraps a foodstuff.

In addition, the information obtaining unit 204 may be a microphone that converts a user's voice into an electrical signal. In this case, when the user speaks the name of a foodstuff to the microphone, the microphone converts the user's voice into an audio signal, and the foodstuff is identified based on the audio signal.

The communication unit 205 is an apparatus that communicates with another apparatus connected to the network 400. For example, the communication unit 205 transmits identification information for identifying each foodstuff to be cooked to the server apparatus 300. The communication unit 205 also receives, from the server apparatus 300, foodstuff-specific cooking information 206a including information of cooking methods for individual foodstuffs.

The storage unit 206 is a storage device, such as a memory or a hard-disk device. The storage unit 206 stores, for example, the foodstuff-specific cooking information 206a received from the server apparatus 300. FIG. 3 is a table illustrating one example of the foodstuff-specific cooking information 206a.

Information of foodstuff identifiers (IDs), foodstuff names, heating methods, which are examples of cooking methods, wattages, which are included in setting information used for the cooking methods, and heating times are registered in the foodstuff-specific cooking information 206a illustrated in FIG. 3. The foodstuff ID and the foodstuff name indicate the ID and the name of a corresponding foodstuff to be cooked. The heating method, the wattage, and the heating time indicate a method, a wattage, and a time suitable for heating a corresponding foodstuff.

Temperatures or the like may also be registered instead of the wattages. In such a case, the cooking unit 207 heats each foodstuff until it reaches a registered temperature. A temperature sensor, an infrared thermometer, or the like is used to determine whether or not each foodstuff has reached the registered temperature.

Referring back to FIG. 2, the cooking unit 207 is a device that heats and cooks, when a plurality of foodstuffs are placed on the placement unit 203, the foodstuffs in accordance with the setting information for the cooking methods for the foodstuffs. The cooking unit 207 heats each foodstuff by a method suitable for the foodstuff among cooking methods, such as microwave heating, steam heating, heater heating, and grill heating.

Figure 4A:
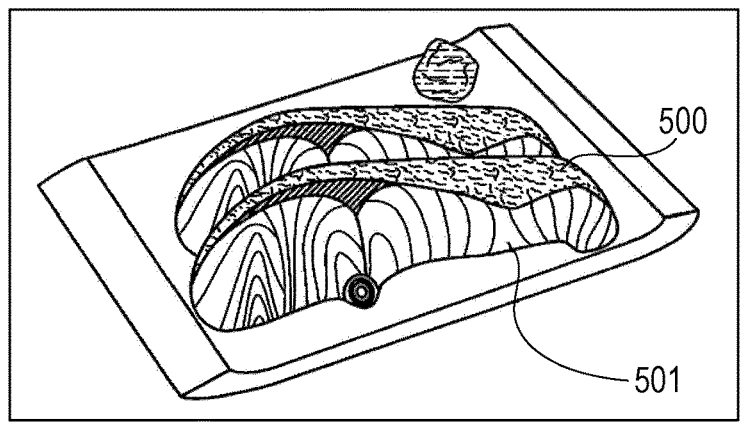
FIG. 4A illustrates one example of cooking methods for individual foodstuffs in the embodiment of the present disclosure.
Figure 4B:
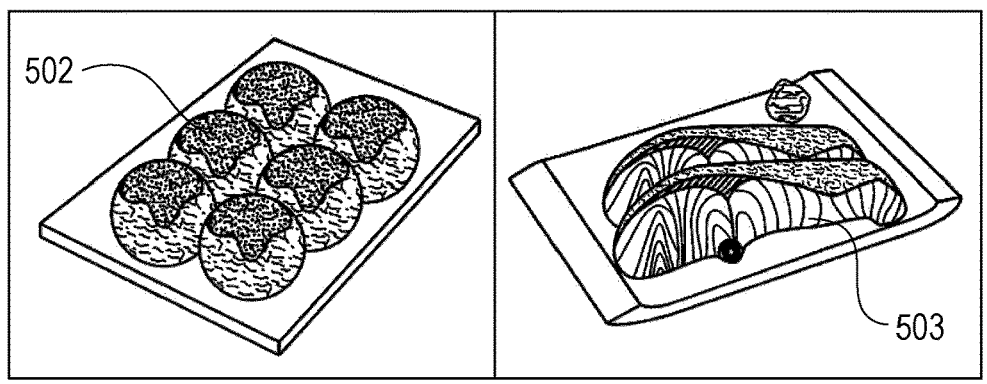
FIG. 4B illustrates one example of cooking methods for individual foodstuffs in the embodiment of the present disclosure.
Figure 4C:
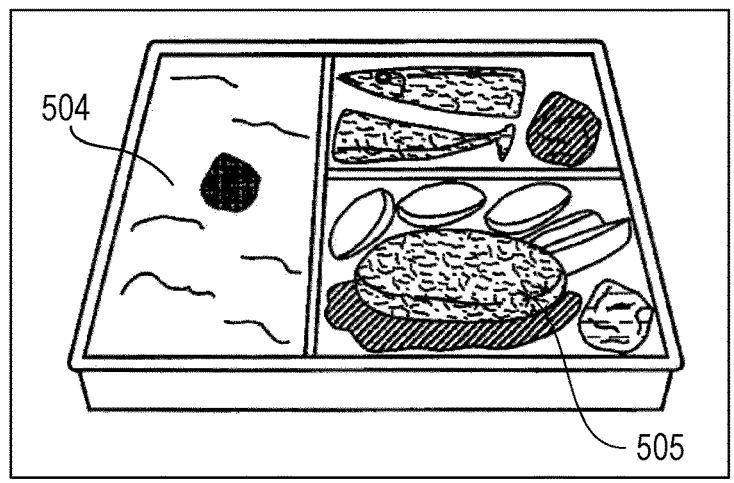
FIG. 4C illustrates one example of cooking methods for individual foodstuffs in the embodiment of the present disclosure.

FIGS. 4A, 4B, and 4C illustrate one example of various cooking methods for individual foodstuffs. FIG. 4A illustrates salmon skins 500 and salmon fillets (not including skin) 501, which are different portions of one type of food. For example, the cooking unit 207 performs heater heating on the salmon skins 500 at 800 W for 5 minutes and performs microwave heating on the salmon fillets 501 at 500 W for 3 minutes.

FIG. 4B illustrates takoyaki (octopus dumplings) 502 and salmon 503, which are two different types of food. For example, the cooking unit 207 performs heater heating on the takoyaki 502 at 600 W for 8 minutes and performs steam heating on the salmon 503 at 600 W for 4 minutes.

FIG. 4C illustrates a bento (a home-packed meal) including rice 504 and hamburger steak 505. For example, the cooking unit 207 performs steam heating on the rice 504 at 500 W for 1 minute and performs heater heating on the hamburger steak 505 at 600 W for 2 minutes.

Figure 5:
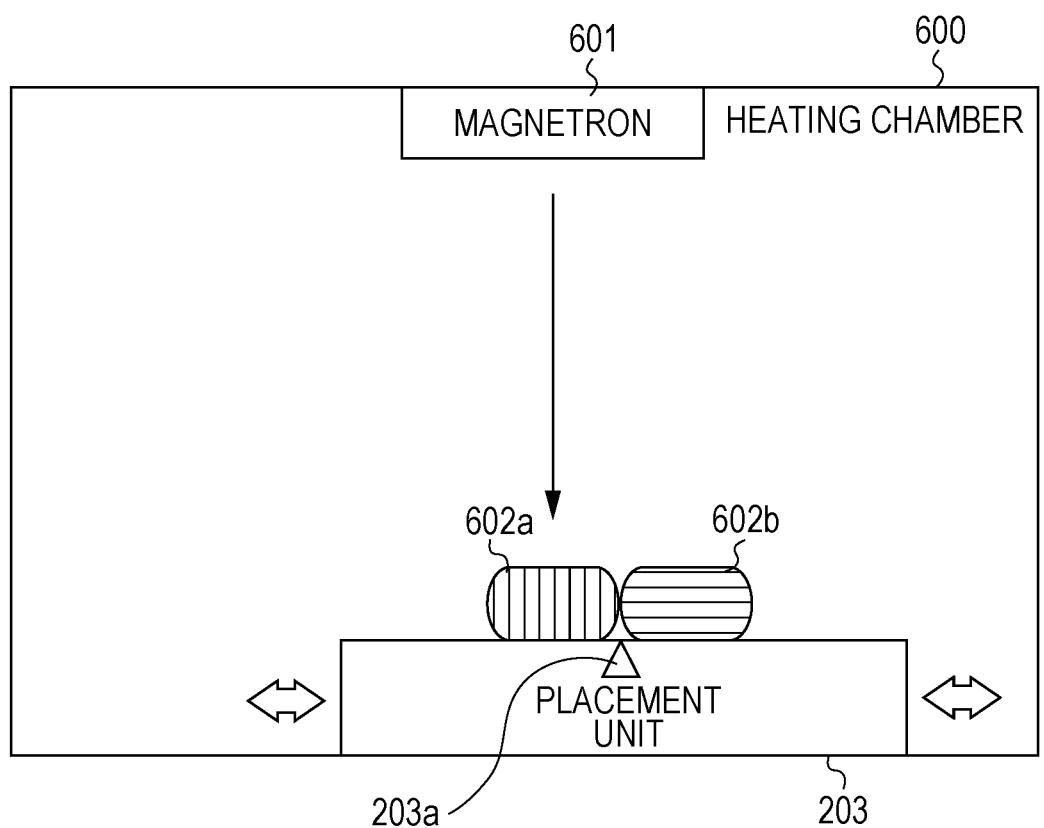
FIG. 5 illustrates one example of a method for performing microwave heating for each foodstuff in the embodiment of the present disclosure.

Heating for each foodstuff is performed, for example, in the manner described below. FIG. 5 illustrates one example of a method for performing microwave heating for each foodstuff. FIG. 5 illustrates a heating chamber 600. The heating chamber 600 has a magnetron 601 and the placement unit 203 therein.

The magnetron 601 is a device that generates directional microwaves. As described above, the placement unit 203 is a table on which foodstuffs 602a and 602b are placed. In order to radiate the microwaves to the foodstuffs 602a and 602b located at detected positions, the placement unit 203 moves horizontally. This makes it possible to selectively heat the foodstuffs 602a and 602b.

The positions of the foodstuffs 602a and 602b may be detected by image recognition of an image captured by the camera. Alternatively, a mark 203a may be attached to the placement unit 203 so that the positions of the foodstuffs 602a and 602b can be determined when the user locates the foodstuffs 602a and 602b to the mark 203a.

For heater heating or steam heating, similarly, the foodstuffs 602a and 602b can be selectively heated by moving the placement unit 203 horizontally and adjusting the distances between the foodstuffs 602a and 602b and a heat source.

The foodstuffs 602a and 602b may also be selectively heated by controlling the radiation direction of the microwaves, the position of a heater, a steam blowing direction, and so on, rather than moving the placement unit 203. Alternatively, the foodstuffs 602a and 602b may also be selectively heated by moving the position(s) of the magnetron 601, the heater, and/or a steam blowing port.

Alternatively, for example, two magnetrons having high directivity may be provided, in which case, the foodstuff 602a is placed on the placement unit 203 in a direction in which microwaves are radiated by one of the magnetrons, and the foodstuff 602b is placed on the placement unit 203 in a direction in which microwaves are radiated by the other magnetron. With such an arrangement, the strength of the microwaves radiated from each magnetron can be controlled independently. Thus, the strength of the microwaves radiated to the foodstuff 602a can be set to a strength corresponding to the setting information of the cooking method for the foodstuff 602a, and the strength of the microwaves radiated to the foodstuff 602b can be set to a strength corresponding to the setting information of the cooking method for the foodstuff 602b. This makes it possible to simultaneously cook the foodstuffs 602a and 602b placed at different positions.

In this case, a light source used for placement of foodstuffs may also be provided for the position of the placement unit 203 to which the microwaves are radiated from the magnetrons.

For example, when the user opens a door of the cooking apparatus 200 in order to place the foodstuff 602a or 602b on the placement unit 203, the light source radiates light. During the radiation, the light from the light source illuminates a position in the vicinity of a position at which the foodstuff 602a or 602b is to be placed.

With such an arrangement, the user of the cooking apparatus 200 can place the foodstuff 602a or 602b at an appropriate position on the placement unit 203.

Alternatively, a light source may also be arranged in the vicinity of the position of the placement unit 203 where the microwaves from the magnetrons are radiated.

For example, when the user opens the door of the cooking apparatus 200 in order to place the foodstuff 602a or 602b on the placement unit 203, a power source for the light source is turned on to lighten the vicinity of the position at which the foodstuff 602a or 602b is to be placed.

With such an arrangement, the user of the cooking apparatus 200 can place the foodstuff 602a or 602b at an appropriate position on the placement unit 203.

Although the above description has been given of an example of a configuration in which two magnetrons having high directivity are provided, the present disclosure is not limited thereto. For example, only one magnetron may be used, as long as it is a magnetron that can radiate microwaves having high directivity in different directions.

Also, the placement unit 203 may also be adapted to move vertically to adjust the distance from a heat source provided at a ceiling portion or the like of the heating chamber 600 to thereby adjust the strength of grill heating or the like.

Referring back to FIG. 2, the control unit 208 is a control device, such as a central processing unit (CPU), for controlling the individual units in the cooking apparatus 200. The control unit 208 includes an identification-information generator 208a, a position detector 208b, and a cooking controller 208c.

The identification-information generator 208a generates identification information to be transmitted to the server apparatus 300, based on the foodstuff information obtained by the information obtaining unit 204. The identification information includes information, such as an ID and the weight of each foodstuff placed on the placement unit 203.

For example, when the information obtaining unit 204 is a camera, the identification-information generator 208a identifies each foodstuff by performing image analysis on an image captured by the camera. The identification-information generator 208a then generates identification information by using an ID corresponding to the identified foodstuff. In this case, it is preferable that the storage unit 206 pre-store information indicating correspondences between foodstuffs and IDs.

The camera may be provided inside or outside the cooking apparatus 200. When the camera is provided inside the cooking apparatus 200, the camera is directed to the heating chamber 600 in the cooking apparatus 200 to capture an image of foodstuffs placed on the placement unit 203. Alternatively, the camera may be directed to outside of the cooking apparatus 200 to capture, through an observation window or the like, an image of foodstuffs before they are put into the heating chamber 600.

When the camera is provided outside the cooking apparatus 200, the camera is directed to outside of the cooking apparatus 200 to capture an image of the foodstuffs before they are put into the heating chamber 600. Alternatively, the camera may be directed to the heating chamber 600 in the cooking apparatus 200 to capture, through an observation window or the like, an image of the foodstuffs placed on the placement unit 203.

Also, when the information obtaining unit 204 is a barcode reader, the identification-information generator 208a generates identification information on the basis of foodstuff ID information indicated by the barcode. It is assumed that the barcode is attached to, for example, a package that wraps each foodstuff.

When the information obtaining unit 204 is a microphone, the identification-information generator 208a identifies each foodstuff by analyzing voice input to the microphone. The identification-information generator 208a uses an ID for the identified foodstuff to generate identification information. In this case, it is also preferable that the storage unit 206 pre-store information indicating correspondences between foodstuffs and IDs.

In addition, the identification-information generator 208a obtains information of a foodstuff weight measured by the weight scale provided for the placement unit 203 and adds the information to the identification information.

Although the above description has been given of a case in which the identification-information generator 208a generates identification information including the ID of each foodstuff, the identification-information generator 208a may also generate identification information including ID information of food including a plurality of foodstuffs.

For example, in the case of the bento including the rice 504 and the hamburger steak 505 in FIG. 4C, when this bento is identified based on the information obtained by the information obtaining unit 204, the identification-information generator 208a may generate identification information including ID information of the bento.

In this case, the identification information is transmitted to the server apparatus 300, and in accordance with the identification information, the server apparatus 300 transmits information of the cooking methods for the foodstuffs included in the bento. In order to realize this function, the information of the cooking methods for the foodstuffs included in the bento may be registered with the server apparatus 300 in association with the ID information of the bento. This arrangement allows the cooking apparatus 200 to obtain information of appropriate cooking methods for the individual foodstuffs included in the bento.

Referring back to FIG. 2, the position detector 208b performs image analysis on an image of the foodstuffs captured by the information obtaining unit 204 to detect the positions of the foodstuffs. As described above with reference to FIG. 5, the position at which the foodstuffs are to be placed may also be pre-specified, for example, by attaching the mark 203a to the placement unit 203.

The identification-information generator 208a and the position detector 208b may also be started up to start generation of identification information and detection of the positions of the foodstuffs, for example, when the door of the heating chamber 600 where the foodstuffs are to be heated is closed or when the weight scale provided for the placement unit 203 detects the weight(s) of the foodstuffs.

The cooking controller 208c controls the cooking unit 207 so as to individually cook the foodstuffs in accordance with the cooking methods for the foodstuffs, the cooking methods being included in the foodstuff-specific cooking information 206a. More specifically, the cooking controller 208c reads the foodstuff-specific cooking information 206a from the storage unit 206 and retrieves the information of the cooking methods for the foodstuffs from the foodstuff-specific cooking information 206a.

The cooking controller 208c then sets the retrieved information for the cooking unit 207 as cooking methods for the foodstuffs. In accordance with the setting information, the cooking unit 207 heats and cooks each foodstuff.

Next, a description will be given of one example of the configuration of the server apparatus 300. The server apparatus 300 is a cloud server apparatus that collects various types of data from various types of equipment connected to the network 400. The server apparatus 300 includes an input unit 301, a display unit 302, a communication unit 303, a storage unit 304, and a control unit 305.

The input unit 301 is an input device, including a keyboard and a mouse. The display unit 302 is a display device, such as a display. The communication unit 303 is a device that communicates with another apparatus connected to the network 400.

For example, the communication unit 303 receives, from the cooking apparatus 200, the identification information that identifies individual foodstuffs to be cooked. The communication unit 303 also transmits the foodstuff-specific cooking information 206a including the information of the cooking methods for individual foodstuffs to the cooking apparatus 200.

The storage unit 304 is a storage device, such as a memory or a hard-disk device. The storage unit 304 stores cooking information 304a. The cooking information 304a is information of cooking methods for various foodstuffs, the cooking methods being received from companies that sell foodstuffs, terminal apparatuses of users who cook foodstuffs, and so on. FIG. 6 is a table illustrating one example of the cooking information 304a.

Information of foodstuff IDs, foodstuff names, weights, heating methods, wattages, heating times, related-foodstuff IDs, and rankings is registered in the cooking information 304a illustrated in FIG. 6.

Each foodstuff ID is identifier information given to a corresponding foodstuff in order to identify the foodstuff. Each foodstuff name is the name of a corresponding foodstuff. Each weight is the weight of a corresponding foodstuff. The information of the weight does not necessarily have to be registered, and is registered when the heating method, the wattage, and the heating time change depending on the weight.

For example, in the example in FIG. 6, information indicating a weight of "less than 100 g" is registered for a foodstuff "salmon slice" with a foodstuff ID "1", and information indicating a weight of "100 g or more" is registered for a foodstuff "salmon slice" with a foodstuff ID "2".

When a weight measured by the placement unit 203 (namely, the weight scale of the placement unit 203) is less than 100 g, the foodstuff "salmon slice" will be cooked with the cooking method registered in association with the foodstuff "salmon slice" with the foodstuff ID "1".

When a weight measured by the placement unit 203 is 100 g or more, the foodstuff "salmon slice" will be cooked with the cooking method registered in association with the foodstuff "salmon slice" with the foodstuff ID "2".

The heating method is information of an optimum heating method for a corresponding foodstuff. For example, in the example in FIG. 6, microwave heating, heater heating, and steam heating are registered for the heating method. The wattage is setting information of an optimum power consumption (a wattage). The heating time is information of an optimum heating time.

A temperature or the like may also be registered instead of the wattage. In such a case, the cooking apparatus 200 heats a foodstuff until it reaches the corresponding registered temperature. The cooking apparatus 200 is provided with a temperature sensor, an infrared thermometer, or the like, which is used to determine whether or not each foodstuff reaches the corresponding registered temperature.

The related-foodstuff ID is information of the foodstuff ID of a foodstuff related to a foodstuff. For example, a foodstuff ID "3" is registered for the foodstuffs "salmon slice" with the foodstuff IDs "1" and "2" as a related-foodstuff ID, and the foodstuff IDs "1" and "2" are registered for the foodstuff "salmon skin" with the foodstuff ID "3" as related-foodstuff IDs. Since each foodstuff "salmon slice" has skin, the foodstuff "salmon skin" is registered as a related foodstuff of the foodstuff "salmon slice", and the foodstuff "salmon slice" is registered as a related foodstuff of the foodstuff "salmon skin".

Similarly, a foodstuff ID "7" is registered for a foodstuff "rice" with a foodstuff ID "6" as a related-foodstuff ID, and the foodstuff ID "6" is registered for a foodstuff "hamburger steak" with the foodstuff ID "7" as a related-foodstuff ID. The foodstuffs "rice" and "hamburger steak" in this case are foodstuffs included in one bento. Thus, the foodstuff "rice" is registered as a related foodstuff of the foodstuff "hamburger steak", and the foodstuff "hamburger steak" is registered as a related foodstuff of the foodstuff "rice".

The ranking is information of an order of a cooking method for a foodstuff. This ranking information is obtained as a result of voting by users. For example, three heating times "4 minutes", "5 minutes", and "6 minutes" are registered for the foodstuff "salmon skin" with the foodstuff ID "3". The rankings for the heating times "4 minutes", "5 minutes", and "6 minutes" are "2", "1", and "3", respectively. This means that the number of the users' votes was large in the order of the heating times "5 minutes", "4 minutes", and "6 minutes".

For example, the user, who uses the cooking apparatus 200, operates the input unit 201 of the cooking apparatus 200 to instruct the cooking apparatus 200 so as to perform cooking with the cooking method for which the number of votes was large. In this case, the cooking apparatus 200 transmits, to the server apparatus 300, a signal that requests it so as to transmit the cooking method whose ranking indicates "1".

Upon receiving the signal, the server apparatus 300 transmits information of the cooking method whose ranking indicates "1" to the cooking apparatus 200. As a result, the user can perform cooking with the cooking method in which evaluations of a large number of users are reflected.

Referring back to FIG. 2, the control unit 305 is a control device, such as a CPU, that controls the individual units in the server apparatus 300. The control unit 305 has a cooking-information manager 305a.

The cooking-information manager 305a is a processing unit that manages the cooking information 304a stored in the storage unit 304.

For example, the cooking-information manager 305a performs processing for registering, in the cooking information 304a, information of cooking methods transmitted from companies that sell foodstuffs, terminal apparatuses which is used by users who cook foodstuffs, and so on.

More specifically, the cooking-information manager 305a registers the information of foodstuff names, weights, heating methods, wattages, heating times, and related-foodstuff IDs in the cooking information 304a. During the registration, the cooking-information manager 305a generates a foodstuff ID so that it differs from the other foodstuff IDs and registers information of the generated foodstuff ID.

The cooking-information manager 305a registers, in the cooking information 304a, information of a ranking for each cooking method for a foodstuff. More specifically, the cooking-information manager 305a generates data of a website that receives votes for each cooking method for a foodstuff and transmits the generated data to the terminal apparatuses, which the users use, through the network 400.

The cooking-information manager 305a aggregates the number of votes for each cooking method which are cast by the users through the website and determines the order of the cooking methods. Thereafter, the cooking-information manager 305a registers the order in the cooking information 304a as the ranking information. The cooking-information manager 305a periodically performs the processing described above.

In addition, the cooking-information manager 305a generates the foodstuff-specific cooking information 206a described above and transmits the generated foodstuff-specific cooking information 206a to the cooking apparatus 200 via the communication unit 303. Each foodstuff will be cooked based on the foodstuff-specific cooking information 206a.

More specifically, when the communication unit 303 receives the above-described identification information from the cooking apparatus 200, the cooking-information manager 305a searches for, in the cooking information 304a, information of a foodstuff ID, a foodstuff name, a heating method, a wattage, and a heating time corresponding to the foodstuff ID included in the identification information, and generates the foodstuff-specific cooking information 206a, based on the information resulting from the searching.

Figure 7:
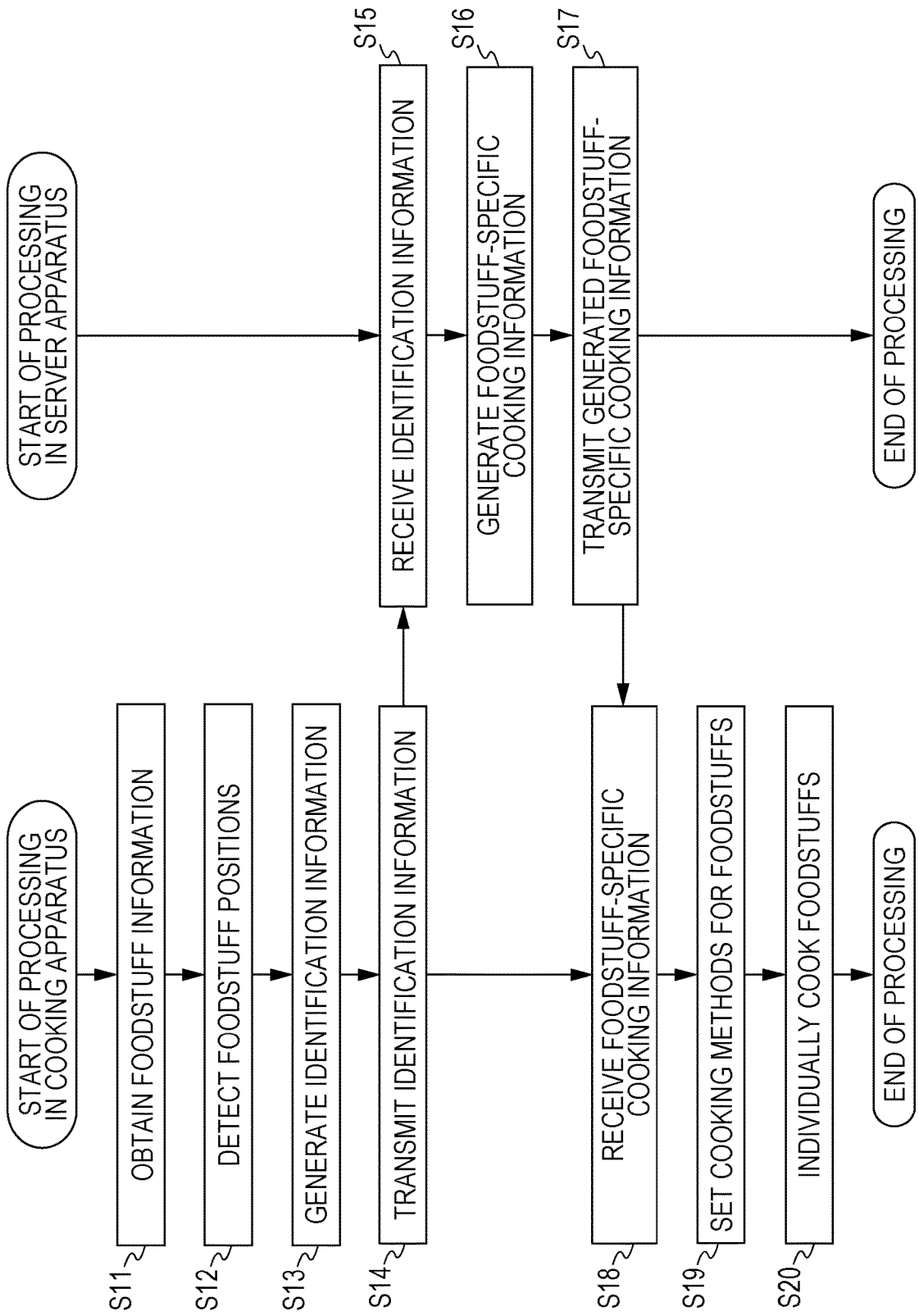
FIG. 7 is a sequence diagram illustrating one example of a cooking method according to the embodiment of the present disclosure.

Next, a description will be given of one example of a cooking method according to the embodiment of the present disclosure. FIG. 7 is a sequence diagram illustrating one example of a cooking method according to the embodiment of the present disclosure. Since the processing performed by the cooking apparatus 200 and the server apparatus 300 has already been described with reference to FIG. 2 and so on a, detailed description is not given hereinafter.

First, in step S11, the cooking apparatus 200 obtains information, such as image data of individual foodstuffs, necessary to identify the foodstuffs to be cooked from now. In step S12, the cooking apparatus 200 also detects the positions of the respective foodstuffs on the placement unit 203.

Thereafter, in step S13, on the basis of the obtained information, the cooking apparatus 200 generates identification information to be transmitted to the server apparatus 300. In step S14, the cooking apparatus 200 transmits the generated identification information to the server apparatus 300.

On the other hand, in step S15, the server apparatus 300 receives the identification information transmitted by the cooking apparatus 200. In step S16, the server apparatus 300 searches for, in the cooking information 304a, information of foodstuff IDs, foodstuff names, heating methods, wattages, and heating times corresponding to the identification information, and generates the foodstuff-specific cooking information 206a, based on the information resulting from the searching.

Thereafter, in step S17, the server apparatus 300 transmits the generated foodstuff-specific cooking information 206a to the cooking apparatus 200.

Subsequently, in step S18, the cooking apparatus 200 receives the foodstuff-specific cooking information 206a transmitted by the server apparatus 300. In step S19, the cooking apparatus 200 retrieves cooking methods for the respective foodstuffs from the foodstuff-specific cooking information 206a and sets the retrieved cooking methods as cooking methods for the foodstuffs.

Thereafter, in step S20, the cooking apparatus 200 individually cooks the foodstuffs in accordance with the set cooking methods for the foodstuffs.

Although the description in the above embodiment has been given of a case in which the identification-information generator 208a included in the cooking apparatus 200 transmits the identification information for identifying the foodstuffs to the server apparatus 300, an apparatus other than the cooking apparatus 200 may also transmit the identification information to the server apparatus 300.

For example, a terminal apparatus, such as a smartphone, may identify each foodstuff and transmit the identification information including information of the foodstuff to the server apparatus 300.

In such a case, a terminal apparatus having a function of a camera may identify a foodstuff by performing image analysis on an image captured by the camera. Alternatively, a terminal apparatus having a function of a barcode reader may identify a foodstuff, based on information of a foodstuff ID included in the barcode. Alternatively, a terminal apparatus having a function of a microphone may identify a foodstuff by analyzing voice input by the microphone.

Alternatively, when a terminal apparatus is used to purchase foodstuffs through online shopping and displays a purchase list of the foodstuffs, the terminal apparatus may receive, from the user, a selected foodstuff in the purchase list to identify the foodstuff.

Alternatively, when a terminal apparatus is used for inventory control of foodstuffs and displays an inventory list of the foodstuffs, the terminal apparatus may receive, from the user, a selected foodstuff in the inventory list to identify the foodstuff.

A terminal apparatus may obtain, through input by the user, the weight information included in the identification information, or a terminal apparatus may communicate with the cooking apparatus 200 to obtain the weight information from the cooking apparatus 200. Alternatively, the cooking apparatus 200 may also directly transmit the weight information to the server apparatus 300.

Although the description in the above embodiment has been given of a case in which the identification-information generator 208a in the cooking apparatus 200 identifies each foodstuff on the basis of the foodstuff information obtained by the information obtaining unit 204, the server apparatus 300 may also identify each foodstuff.

In such a case, the foodstuff information obtained by the information obtaining unit 204 is transmitted to the server apparatus 300, and the server apparatus 300 identifies each foodstuff on the basis of the foodstuff information. When the foodstuff information obtained by a terminal apparatus, such as a smartphone, is transmitted to the server apparatus 300, the server apparatus 300 may also identify each foodstuff on the basis of the foodstuff information.

Also, information of the order of heating may also be included in the foodstuff-specific cooking information 206a illustrated in FIG. 3 and the cooking information 304a illustrated in FIG. 6. The information of the order of heating is, for example, information indicating that hamburger steak is heated first and rice is then heated. This makes it possible to cook each foodstuff with a more optimum cooking method.

In addition, with respect to one foodstuff, information of a plurality of cooking methods may also be included in the foodstuff-specific cooking information 206a illustrated in FIG. 3 and the cooking information 304a illustrated in FIG. 6. For example, in the cooking information 304a illustrated in FIG. 6, "microwave heating and grill heating" may be registered in the field "heating method" for the foodstuff "salmon slice" with the foodstuff ID "1", "500 W and NULL" may be registered in the field "wattage", and "3 minutes and 1 minute" may be registered in the field "heating time".

In this case, when the foodstuff "salmon slice" with the foodstuff ID "1" is placed on the placement unit 203 in the cooking apparatus 200, the above-described information is transmitted from the server apparatus 300 to the cooking apparatus 200 and is stored in the foodstuff-specific cooking information 206a.

In accordance with the information, the foodstuff "salmon slice" is first cooked with 500 W microwave heating for 3 minutes and is then cooked with grill heating for 1 minute. When cooking information for one foodstuff is registered in the foodstuff-specific cooking information 206a after cooking of the foodstuff "salmon slice" is completed, cooking of that registered foodstuff is executed in accordance with the cooking information.

While the embodiment according to the present disclosure has been described above in detail with reference to the accompanying drawings, the functions of the above-described apparatuses, such as the cooking apparatus 200 and the server apparatus 300, can be realized by a computer program.

Figure 8:
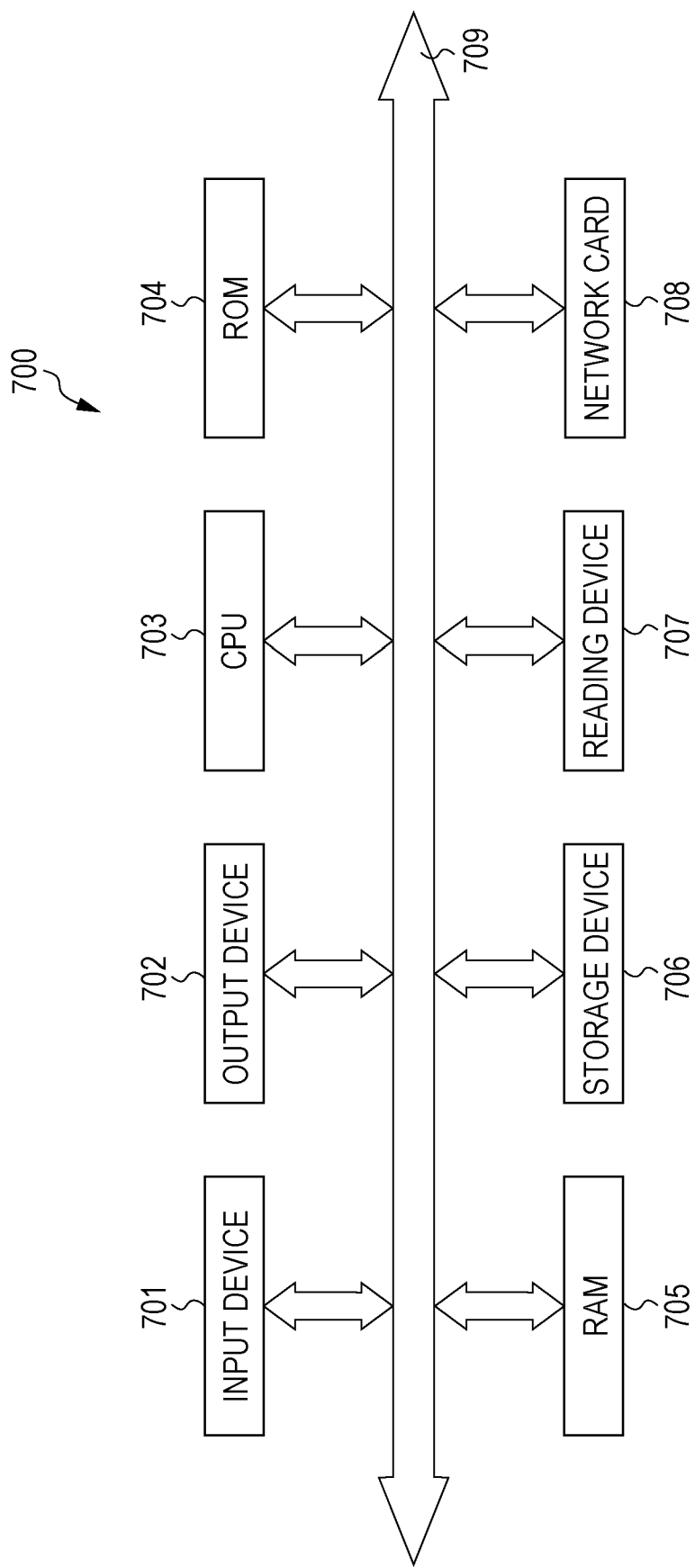
FIG. 8 is a block diagram illustrating a hardware configuration of a computer that realizes the functions of each apparatus by using a program in the embodiment of the present disclosure.

FIG. 8 is a block diagram illustrating a hardware configuration of a computer 700 that realizes the functions of each apparatus by using a program.

For example, the computer 700 includes an input device 701, such as a keyboard, a mouse, and/or a touch pad, an output device 702, such as a display and/or a speaker, a CPU 703, a read only memory (ROM) 704, a random access memory (RAM) 705, a storage device 706, such as a hard-disk device or a solid-state drive (SSD), a reading device 707 that reads information from a recording medium, such as a digital versatile disk read-only memory (DVD- ROM) or a Universal Serial Bus (USB) memory, and a network card 708 that performs communication through a network. The elements included in the computer 7009 are connected to each other through a bus 709.

The reading device 707 reads a program for realizing the functions of each apparatus described above from a recording medium on which the program is recorded, and the read program is stored in the storage device 706. Alternatively, the network card 708 communicates with a server apparatus, connected to a network, to download the program for realizing the functions of each apparatus from the server apparatus, and the program is stored in the storage device 706.

The CPU 703 then copies the program, stored in the storage device 706, to the RAM 705, sequentially reads instructions, included in the program, from the RAM 705, and executes the instructions to thereby realize the functions of each apparatus described above.

The technology described in the above-described embodiment can be realized, for example, by the following types of cloud service. However, the types of service for which the technology described in the above-described embodiment is realized are not limited to the types described below.
(Service Type 1: Inhouse Data Center Type)

Figure 9:
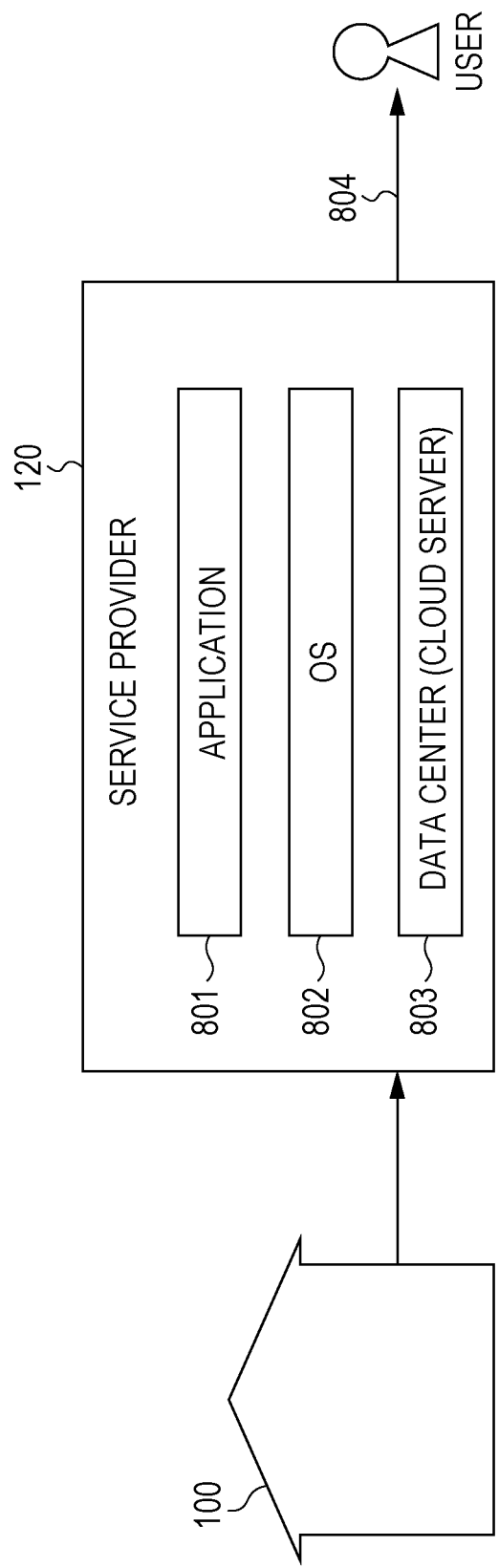
FIG. 9 is a diagram illustrating one example of service type (an inhouse data center type) in the embodiment of the present disclosure.

FIG. 9 is a diagram illustrating service type 1 (an inhouse data center type). This type is a type in which a service provider 120 obtains information from a group 100 and provides a user with a service. In this type, the service provider 120 has functions of a data-center operating company. That is, the service provider 120 has a cloud server 111 for managing big data. Thus, no data-center operating company exists.

In this type, the service provider 120 operates and manages a data center 803 (the cloud server 111). The service provider 120 manages an operating system (OS) 802 and an application 801. The service provider 120 provides a service 804 by using the OS 802 and the application 801 managed by the service provider 120.
(Service Type 2: IaaS Using Type)

Figure 10:
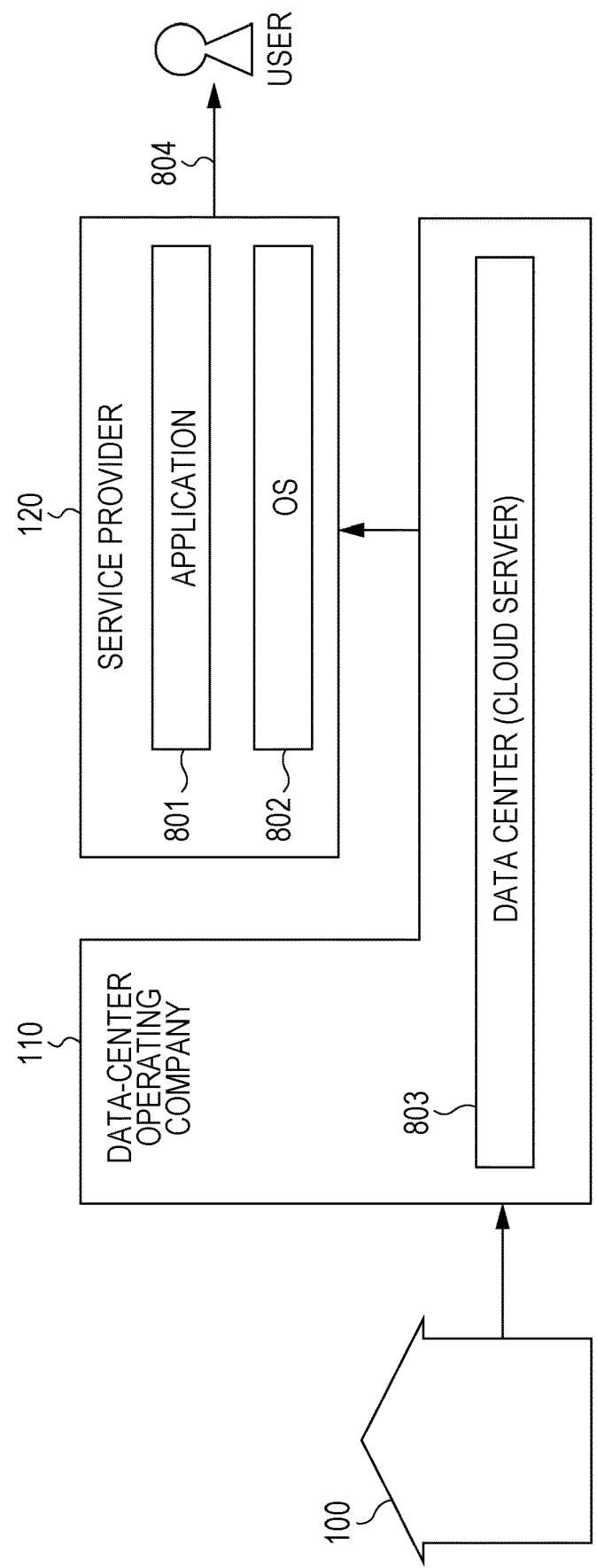
FIG. 10 is a diagram illustrating one example of service type (an IaaS using type) in the embodiment of the present disclosure.

FIG. 10 is a diagram illustrating service type 2 (an IaaS using type). IaaS is an acronym of Infrastructure as a Service and is a cloud-service-providing model that provides, as a service over the Internet, infrastructure itself for constructing and operating a computer system.

In this type, a data-center operating company 110 operates and manages a data center 803 (a cloud server 111). A service provider 120 manages an OS 802 and an application 801. The service provider 120 provides a service by using the OS 802 and the application 801 managed by the service provider 120, as denoted by 804.
(Service Type 3: PaaS Using Type)

Figure 11:
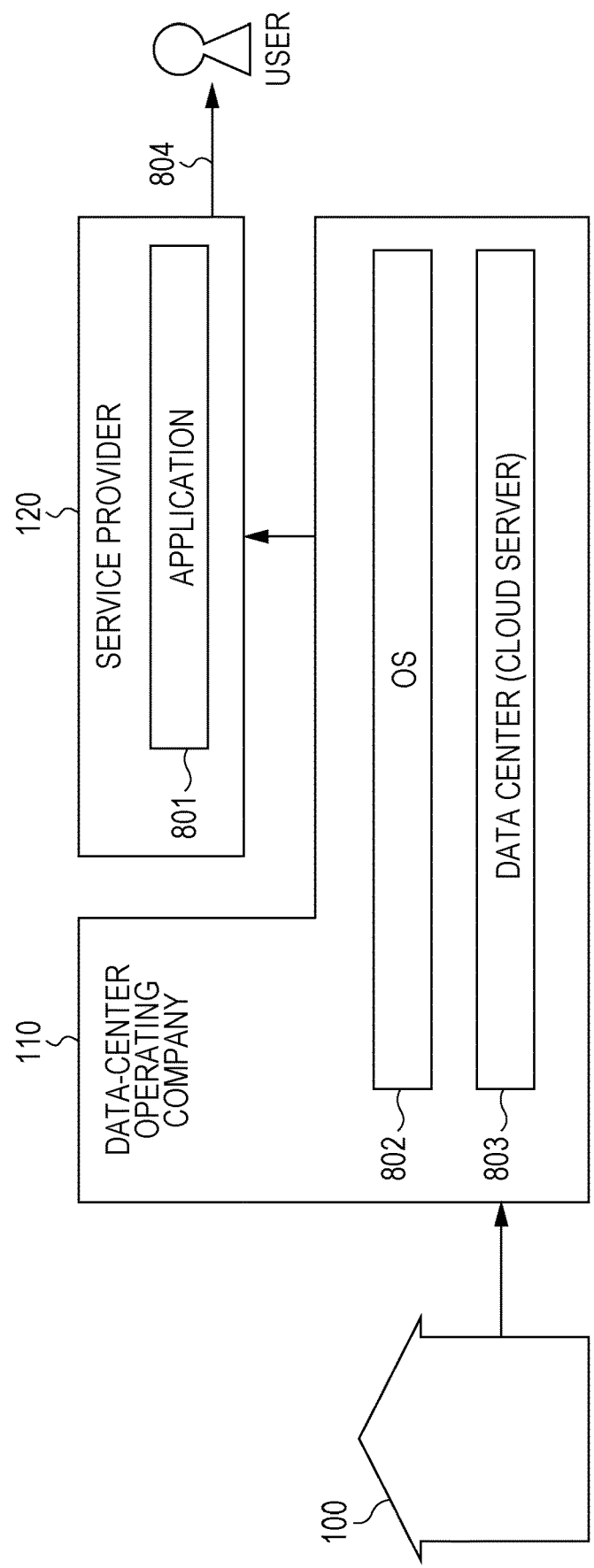
FIG. 11 is a diagram illustrating one example of service type 3 (a PaaS using type) in the embodiment of the present disclosure.

FIG. 11 is a diagram illustrating service type 3 (a PaaS using type). PaaS is an acronym of Platform as a Service and is a cloud-service-providing model that provides, as a service over the Internet, a platform that serves as a foundation for constructing and operating software.

In this type, a data-center operating company 110 manages an OS 802 and operates and manages a data center 803 (a cloud server 111). A service provider 120 manages an application 801. The service provider 120 provides a service by using the OS 802 managed by the data-center operating company 110 and the application 801 managed by the service provider 120, as denoted by 804.
(Service Type 4: SaaS Using Type)

Figure 12:
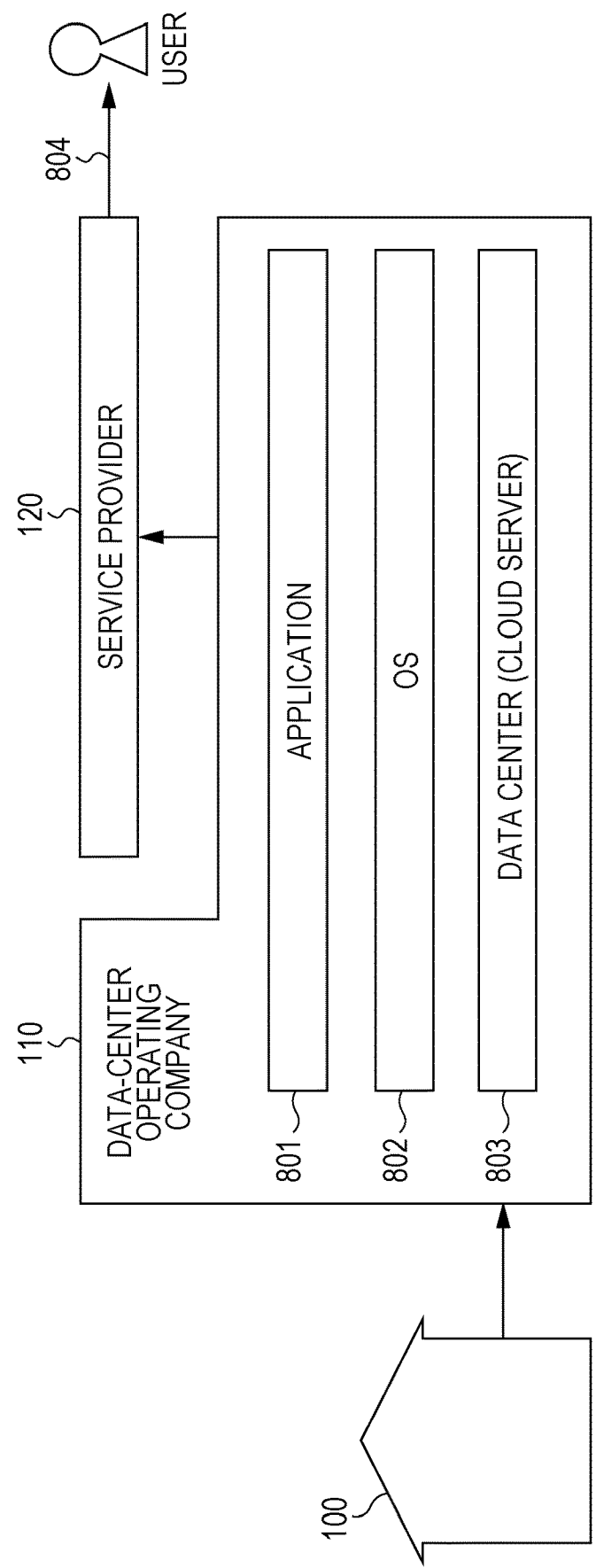
FIG. 12 is a diagram illustrating one example of service type (a SaaS using type) in the embodiment of the present disclosure.

FIG. 12 is a diagram illustrating service type 4 (a SaaS using type). SaaS is an acronym of Software as a Service. SaaS is a cloud-service-providing model having a function by which, for example, companies and individuals (users) that do not own a data center (a cloud server) can use, over a network such as the Internet, applications provided by a platform provider that owns a data center (a cloud server).

In this type, a data-center operating company 110 manages an application 801 and an OS 802 and operates and manages a data center 803 (a cloud server 111). A service provider 120 provides a service by using the OS 802 and the application 801 managed by the data-center operating company 110, as denoted by 804.

It is assumed that the service provider 120 provides a service in any of the types described above. For example, the service provider 120 or the data-center operating company 110 may develop the OS, the application, a database for big data, or the like by itself or may also outsource the development to a third party.

The technology disclosed herein is useful for a cooking apparatus, a cooking method, a non-transitory recording medium on which a cooking control program is recorded, and a cooking-information providing method.

What is claimed is:

1. A cooking apparatus comprising:
   a table;
   a cooking device configured to heat or cook a first foodstuff and a second foodstuff;
   a weight scale that measures a weight of the first foodstuff on the table;
   a processor configured to generate first identification information for identifying the first foodstuff, second identification information for identifying the second foodstuff, and weight information indicating the weight of the first foodstuff, the first foodstuff and the second foodstuff being (i) placed at different positions on the table or (ii) included in a food, and the first identification information further including the weight information;
   a communicator configured to (i) transmit, via a network, the first identification information and the second identification information to a server apparatus including a first memory which stores a plurality of pieces of cooking information, the plurality of pieces of cooking information including a first piece of cooking information and a second piece of cooking information, the first piece of cooking information including third identification information that corresponds to the first identification information transmitted from the communicator and first cooking method information indicating a first cooking method to cook the first foodstuff, and the second piece of cooking information including fourth identification information that corresponds to the second identification information transmitted from the communicator and second cooking method information indicating a second cooking method to cook the second foodstuff and (ii) receive, from the server apparatus via the network, the first cooking method information included in the first piece of cooking information and the second cooking method information included in the second piece of cooking information, the first cooking method information and the second cooking method information being selected from the first memory by the server apparatus in accordance with the first identification information and the second identification information; and
   a storage including a second memory, the storage being configured to store the first cooking method information and the second cooking method information, both of which are received from the server apparatus, wherein the processor is configured to control the cooking device to (i) cook the first foodstuff based on the first cooking method indicated by the first cooking method information received from the server apparatus, and (ii) cook the second foodstuff based on the second cooking method indicated by the second cooking method information received from the server apparatus, the first cooking method information is selected from the first memory by the server apparatus in accordance with the weight information included in the first identification information, and the processor controls the cooking device to cook the first foodstuff based on the first cooking method indicated by the first cooking method information received from the server apparatus.

2. The cooking apparatus according to claim 1, wherein the processor generates the identification information, based on an audio signal input by a microphone.

3. The cooking apparatus according to claim 1, wherein the processor generates the first identification information and the second identification information, based on an image, including the first foodstuff and the second foodstuff, captured by a camera.

4. The cooking apparatus according to claim 1, wherein the processor generates the first identification information and the second identification information, based on the first foodstuff and the second foodstuff or a barcode attached to a food package that wraps the first foodstuff and the second foodstuff.

5. The cooking apparatus according to claim 1, wherein the processor detects positions of the first foodstuff and the second foodstuff placed on the table, and wherein the processor controls the cooking of the first foodstuff and the cooking of the second foodstuff, based on the detected position of the first foodstuff and the detected position of the second foodstuff.

6. The cooking apparatus according to claim 1, wherein the first foodstuff and the second foodstuff are two different types of food.

7. The cooking apparatus according to claim 1, wherein the first foodstuff and the second foodstuff are different portions of one type of food.

8. The cooking apparatus according to claim 1, further comprising:

an input interface that receives second ranking information indicating a second ranking regarding the first cooking method of the first foodstuff, wherein the communicator further transmits the second ranking information to the server apparatus, and wherein the communicator receives the first cooking method information which corresponds to a first ranking information regarding the first cooking method of the first foodstuff, from the server apparatus when it is determined by the server apparatus that a first ranking indicated by first ranking information stored in the memory matches the second ranking indicated by the second ranking information transmitted from the communicator.

* * * * *